(12) United States Patent
Craig et al.

(10) Patent No.: US 8,179,885 B2
(45) Date of Patent: May 15, 2012

(54) METHODS, SYSTEMS, AND COMPUTER PROGRAM PRODUCTS FOR ORGANIZING, MANAGING, AND SELECTIVELY DISTRIBUTING ROUTING INFORMATION IN A SIGNALING MESSAGE ROUTING NODE

(75) Inventors: Jeffrey A. Craig, Durham, NC (US); Mark A. Erickson, Raleigh, NC (US); Mark E. Kanode, Apex, NC (US); Seetharaman Khadri, Cary, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 12/878,015

(22) Filed: Sep. 8, 2010

(65) Prior Publication Data

US 2010/0329152 A1    Dec. 30, 2010

Related U.S. Application Data

(62) Division of application No. 11/084,853, filed on Mar. 18, 2005, now Pat. No. 7,804,789.

(60) Provisional application No. 60/554,092, filed on Mar. 18, 2004.

(51) Int. Cl.
*H04L 12/66* (2006.01)

(52) U.S. Cl. ........ 370/354; 370/356; 370/401; 370/410; 370/467; 379/32.03; 379/229; 709/223

(58) Field of Classification Search .................. None
See application file for complete search history.

(56) References Cited

U.S. PATENT DOCUMENTS

| | | |
|---|---|---|
| 5,008,929 A | 4/1991 | Olsen et al. |
| 5,142,622 A | 8/1992 | Owens |
| 5,208,811 A | 5/1993 | Kashio et al. |
| 5,239,542 A | 8/1993 | Breidenstein et al. |
| 5,315,641 A | 5/1994 | Montgomery et al. |
| 5,384,840 A | 1/1995 | Blatchford et al. |
| 5,420,916 A | 5/1995 | Sekiguchi |
| 5,430,727 A | 7/1995 | Callon |
| 5,509,010 A | 4/1996 | La Porta et al. |
| 5,568,487 A | 10/1996 | Sitbon et al. |

(Continued)

FOREIGN PATENT DOCUMENTS

CA    2239764    12/1998

(Continued)

OTHER PUBLICATIONS

Communication regarding the expiry of the time limit within which notice of opposition may be filed for European Patent No. 1290854 (May 18, 2011).

(Continued)

*Primary Examiner* — Jeffrey M Rutkowski
(74) *Attorney, Agent, or Firm* — Jenkins, Wilson, Taylor & Hunt, P.A.

(57) ABSTRACT

Methods, systems, and computer program products for managing and selectively distributing routing information in a routing node are disclosed. In one implementation, a method for selectively distributing routing information in a routing node includes organizing internal signaling resources are organized so as to facilitate the efficient mapping of signaling system 7 (SS7) message transfer part (MTP) signaling protocol attributes to Internet protocol (IP)-based signaling resources. A routing status information sharing hierarchy is defined, which enables routing status information to be efficiently shared among members of a signaling mateset group. Members of a signaling mateset replicate and distribute SS7 MTP network management information across non-MTP signaling connections, such as IP connections.

7 Claims, 10 Drawing Sheets

U.S. PATENT DOCUMENTS

| | | |
|---|---|---|
| 5,581,558 A | 12/1996 | Horney, II et al. |
| 5,583,927 A | 12/1996 | Ely et al. |
| 5,586,177 A | 12/1996 | Farris et al. |
| 6,809,028 B2 | 1/1997 | Brockman et al. |
| 5,638,431 A | 6/1997 | Everett et al. |
| 5,640,446 A | 6/1997 | Everett et al. |
| 5,650,998 A | 7/1997 | Angenot et al. |
| 5,651,002 A | 7/1997 | Van Seters et al. |
| 5,657,452 A | 8/1997 | Kralowetz et al. |
| 5,664,102 A | 9/1997 | Faynberg |
| 5,675,635 A | 10/1997 | Vos et al. |
| 5,680,437 A | 10/1997 | Segal |
| 5,680,552 A | 10/1997 | Netravali et al. |
| 5,694,463 A | 12/1997 | Christie et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,761,281 A | 6/1998 | Baum et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,771 A | 8/1998 | Darland et al. |
| 5,802,285 A | 9/1998 | Hirviniemi |
| 5,809,028 A | 9/1998 | Nethercott et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,898,667 A | 4/1999 | Longfield et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,940,598 A | 8/1999 | Strauss et al. |
| 5,949,871 A | 9/1999 | Kabay et al. |
| 5,958,016 A | 9/1999 | Chang et al. |
| 5,966,431 A | 10/1999 | Reiman et al. |
| 5,974,052 A | 10/1999 | Johnson et al. |
| 5,991,301 A | 11/1999 | Christie |
| 5,995,608 A | 11/1999 | Detampel, Jr. et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,061,364 A | 5/2000 | Hager et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,719 A | 8/2000 | Benash et al. |
| 6,097,805 A | 8/2000 | Figurski et al. |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,365 A | 9/2000 | Yegoshin |
| 6,125,111 A | 9/2000 | Snow et al. |
| 6,125,177 A | 9/2000 | Whittaker |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,144,667 A | 11/2000 | Doshi et al. |
| 6,144,670 A | 11/2000 | Sponaugle et al. |
| 6,151,390 A | 11/2000 | Volftsun et al. |
| 6,154,445 A | 11/2000 | Farris et al. |
| 6,154,467 A | 11/2000 | Hager et al. |
| 6,157,710 A | 12/2000 | Figurski et al. |
| 6,167,025 A | 12/2000 | Hsing et al. |
| 6,178,181 B1 | 1/2001 | Glitho |
| 6,195,425 B1 | 2/2001 | Farris |
| 6,201,804 B1 | 3/2001 | Kikinis |
| 6,215,783 B1 | 4/2001 | Neyman |
| 6,236,722 B1 | 5/2001 | Gilbert et al. |
| 6,240,067 B1 | 5/2001 | Sorber |
| 6,278,697 B1 | 8/2001 | Brody et al. |
| 6,298,120 B1 | 10/2001 | Civanlar et al. |
| 6,324,183 B1 | 11/2001 | Miller et al. |
| 6,327,258 B1 | 12/2001 | Deschaine et al. |
| 6,327,267 B1 | 12/2001 | Valentine et al. |
| 6,333,931 B1 | 12/2001 | LaPier et al. |
| 6,366,655 B1 | 4/2002 | Book et al. |
| 6,377,799 B1 | 4/2002 | Hameleers et al. |
| 6,400,813 B1 | 6/2002 | Birnhak |
| 6,415,027 B1 | 7/2002 | Malik |
| 6,442,169 B1 | 8/2002 | Lewis |
| 6,483,837 B1 | 11/2002 | Howell et al. |
| 6,487,286 B1 | 11/2002 | Reaves et al. |
| 6,507,649 B1 | 1/2003 | Tovander |
| 6,515,985 B2 | 2/2003 | Shmulevich et al. |
| 6,515,997 B1 | 2/2003 | Feltner et al. |
| 6,522,667 B1 | 2/2003 | Oda et al. |
| 6,529,524 B1 | 3/2003 | Liao et al. |
| 6,584,190 B1 | 6/2003 | Bressler |
| 6,594,258 B1 | 7/2003 | Larson et al. |
| 6,611,532 B1 | 8/2003 | Madour et al. |
| 6,611,533 B1 | 8/2003 | Liao et al. |
| 6,625,170 B1 | 9/2003 | Curry et al. |
| 6,625,461 B1 | 9/2003 | Bertacchi |
| 6,631,133 B1 | 10/2003 | Christie et al. |
| 6,674,748 B1 | 1/2004 | Dykhuizen et al. |
| 6,678,242 B1 | 1/2004 | Simon |
| 6,681,009 B1 | 1/2004 | Graf et al. |
| 6,683,881 B1 | 1/2004 | Mijares et al. |
| 6,724,752 B1 | 4/2004 | Turtiainen et al. |
| 6,731,741 B1 | 5/2004 | Fourcand et al. |
| 6,760,343 B1 | 7/2004 | Krishnamurthy et al. |
| 6,944,184 B1 | 9/2005 | Miller et al. |
| 7,035,260 B1* | 4/2006 | Betta et al. .................... 370/401 |
| 7,079,524 B2* | 7/2006 | Bantukul et al. .............. 370/352 |
| 7,197,036 B2 | 3/2007 | Craig |
| 7,318,091 B2 | 1/2008 | Brendes et al. |
| 7,486,676 B1 | 2/2009 | Dunn et al. |
| 7,496,087 B2 | 2/2009 | Garnero et al. |
| 7,743,131 B2 | 6/2010 | Brendes et al. |
| 7,804,789 B2 | 9/2010 | Craig et al. |
| 2001/0046227 A1 | 11/2001 | Matsuhira et al. |
| 2001/0049730 A1* | 12/2001 | Brendes et al. ............... 709/223 |
| 2002/0018447 A1 | 2/2002 | Yamada et al. |
| 2002/0021661 A1 | 2/2002 | DeGrandpre et al. |
| 2002/0048360 A1 | 4/2002 | Zambre et al. |
| 2002/0141386 A1* | 10/2002 | Minert et al. ................. 370/352 |
| 2003/0076815 A1* | 4/2003 | Miller et al. .................. 370/352 |
| 2003/0177221 A1* | 9/2003 | Ould-Brahim et al. ....... 709/223 |
| 2003/0202507 A1* | 10/2003 | Nishida et al. ................ 370/352 |
| 2004/0017799 A1 | 1/2004 | Pulkka |

| | | | |
|---|---|---|---|
| 2005/0232407 | A1 | 10/2005 | Craig et al. |
| 2006/0023658 | A1* | 2/2006 | Phillips et al. ............... 370/352 |
| 2007/0008955 | A1 | 1/2007 | Delaney et al. |
| 2007/0070980 | A1* | 3/2007 | Phelps et al. .................. 370/352 |
| 2008/0075068 | A1 | 3/2008 | Brendes et al. |
| 2008/0075115 | A1* | 3/2008 | Brendes et al. ............... 370/467 |
| 2009/0034512 | A1 | 2/2009 | Bantukul et al. |

FOREIGN PATENT DOCUMENTS

| | | |
|---|---|---|
| EP | 0 853 411 A2 | 7/1998 |
| EP | 1 014 735 | 12/1999 |
| EP | 1 054 568 | 5/2000 |
| EP | 1 026 861 A2 | 8/2000 |
| EP | 1 089 575 | 9/2000 |
| EP | 1 206 079 A2 | 5/2002 |
| EP | 1 290 854 B1 | 7/2010 |
| WO | WO 97/11563 | 3/1997 |
| WO | WO 97/42774 | 11/1997 |
| WO | WO 97/42776 | 11/1997 |
| WO | WO 98/28879 | 7/1998 |
| WO | WO 98/28885 | 7/1998 |
| WO | WO 98/28897 | 7/1998 |
| WO | WO 99/09759 | 2/1999 |
| WO | WO 99/16256 | 4/1999 |
| WO | WO 00/19758 | 4/2000 |
| WO | WO 00/22840 | 4/2000 |
| WO | WO 00/30369 | 5/2000 |
| WO | WO 00/31933 | 6/2000 |
| WO | WO 00/33519 | 6/2000 |
| WO | WO 00/54476 | 9/2000 |
| WO | WO 00/56032 | 9/2000 |
| WO | WO 01/11825 | 2/2001 |
| WO | WO 01/24499 | 4/2001 |
| WO | WO 01/37532 | 5/2001 |
| WO | WO 01/93526 A2 | 12/2001 |

OTHER PUBLICATIONS

Non-Final Official Action for U.S. Appl. No. 11/986,500 (Apr. 1, 2011).
Notice of Allowance and Fee(s) Due for U.S. Appl. No. 11/084,853 (May 24, 2010).
Communication under Rule 71(3) EPC for Application No. 01 939 711.6 (Feb. 9, 2010).
Final Official Action for U.S. Appl. No. 11/084,853 (Aug. 18, 2009).
Official Action for U.S. Appl. No. 11/986,493 (Jun. 9, 2009).
Official Action for U.S. Appl. No. 11/084,853 (Jan. 8, 2009).
Communication pursuant to Article 94(3) EPC for European Application No. 01 939 711.6 (Nov. 4, 2008).
Restriction/Election Requirement for U.S. Appl. No. 11/084,853 (Sep. 23, 2008).
Notice of Allowance and Fee(s) Due for U.S. Appl. No. 09/770,316 (Aug. 13, 2007).
Bates et al., "Multiprotocol Extensions for BGP-4," Network Working Group, RFC 4760 (Jan. 2007).
Official Action for U.S. Appl. No. 09/770,316 (Dec. 5, 2006).
3GPP, "3rd Generation Partnership Project; Technical Specification Group Services and System Aspects; IP Multimedia Subsystem (IMS); Stage 2," 3GPP TS 23.228, V6.15.0, p. 1-178 (Sep. 2006).
Advisory Action for U.S. Appl. No. 09/770,316 (Mar. 21, 2006).
Notice of Panel Decision from Pre-Appeal Brief Review for U.S. Appl. No. 09/770,316 (Feb. 14, 2006).
Communication pursuant to Article 96(2) EPC in European Application No. 01939711.6 (Feb. 6, 2006).
Rekhter et al., "A Border Gateway Protocol 4 (BGP-4)," Network Working Group, RFC 4271 (Jan. 2006).
Official Action for U.S. Appl. No. 09/770,316 (Jul. 27, 2005).
Official Action for U.S. Appl. No. 09/770,316 (Nov. 3, 2004).
PAI, "In-Building Wireless: The Next Generation," TelephonyOnline.com, pp. 1-4 (Jun. 30, 2004).
Restriction and/or Election Requirement for U.S. Appl. No. 09/770,316 (Jun. 14, 2004).
Handa, "In Building Wireless: The Next Generation," TMCnet.com, pp. 1-7 (Feb. 12, 2004).
Telcordia Technologies Specification of Signaling System No. 7, "Annex A: SS7 Message Priorities," GR-246-CORE, Issue 8 (Dec. 2003).

Fitchard, "A New Voice in the Boardroom," Wireless Review, pp. 1-3 (Sep. 1, 2003).
Chandra, "Capabilities Advertisement with BGP-4," Network Working Group, RFC 3392 (Nov. 2002).
"Fixed Wireless Technology," ISP Planet, pp. 1-4 (May 14, 2002).
International Search Report for International Application No. PCT/US01/17483 (Mar. 25, 2002).
Martinek, "Office on the Fly," Wireless Review, pp. 1-4 (Jul. 15, 2001).
"March Networks 3300 Integrated Communications Platformm," Mitel Networks Corporation, pp. 1-34 (Jul. 2001).
Sidebottom et al., "SS7 MTP3-User Adaptation Layer (M3UA)," Internet Draft, Network Working Group, pp. 1-79 (Nov. 2000).
"Digital Cellular Telecommunications System (Phase 2+) (GSM); Universal Mobile Telecommunications System (UMTS); Telecommunication Management Charging and Billing; 3G Call and Event Data for the Packet Switched (PS) Domain (3GPP TS 32.015 Version 3.3.0 Release 1999)," Global System for Mobile Communications, pp. 1-65 (Sep. 2000).
Sidebottom et al., "SS7 MTP3-User Adaptation Layer (M3UA)," Internet draft, IETF Network Working Group, p. 1-75, (Sep. 2000).
Subbiah et al., "Transport Architecture Evolution in UMTS/IMT-2000 Cellular Networks," International Journal of Communication Systems, pp. 371-385 (Aug. 11, 2000).
Raivio, "Transport Protocol Evolution in 3G Networks," World Telecommunications Congress/ISS2000, pp. 1-11 (Aug. 5, 2000).
Loughney, "IP-Based Signaling Needs in Radio Access Networks," Internet draft, draft-loughney-sigtran-ip-ran-00.txt, IETF Sigtran Working Group, p. 1-14, (Jun. 16, 2000).
Loughney et al., "SS7 SCCP-User Adaptation Layer (SUA)," Internet draft, draft-loughney-sigtran-sua-00.txt, IETF Engineering Task Force, p. 1-53, (Mar. 8, 2000).
"The Wireless Business Connection," Second Quarter 2000 Report, The Phillips Group-Infotech, pp. 1-9 (2000).
"Ericsson Announces General Availability of Its Mobile Advantage Wireless Office System," Ericsson Press Release, pp. 1-2 (Nov. 4, 1999).
Ong et al., "Framework Architecture for Signaling Transport," Network Working Group, pp. 1-24 (Oct. 1999).
ITU-T Recommendation Q.2630.1 (Sep. 29, 1999).
O'Shea, "Mating Season," Telephony, p. 10-11, (Sep. 20, 1999).
"Corporate Offices to Go Wireless First Australian GSM on the Net Trial," Ericsson Press Release, pp. 1-3 (Aug. 11, 1999).
ITU-T Recommendation Q.2150.1 (Jun. 23, 1999).
"Ericsson Solution Chosen for World's First Combined DECT/GSM Communications Service," Ericsson, pp. 1-9 (Jun. 21, 1999).
Hamdi et al., "Voice Service Interworking for PSTN and IP Networks," IEEE Communications Magazine, p. 104-111, (Jun. 5, 1999).
Sprague et al., "Transport Adapter Layer Interface," Tekelec, p. 1-30, (May 28, 1999).
Lakshmi-Ratan, "The Lucent Technologies Softswitch-Realizing the Promise of Convergence," Bell Labs Technical Journal, p. 174-195, (Apr. 5, 1999).
Handley et al., "SIP: Session Initiation Protocol," Internet Draft, Network Working Group, pp. 1-141 (Mar. 1999).
Bressler, "SS7 Level Two Over IP," Nortel Networks, pp. 1-6 (Jan. 1999).
"Enterprise IP Gateway," Ericcson, pp. 1-6 (1999).
"The Ericsson IPT System," Ericsson, pp. 1-8 (1999).
PCS Access Network Requirements: Interface Specification, Interface: Service Access Socket System Interface (SASSI), Version 01.01, Dec. 3, 1998 (Unpublished).
PCS Access Network Requirements: Product Specification, Network Element: Gateway Signal Transfer Point between CCS/SS7 and TCP-IP Networks (GW-STP-IP), Dec. 3, 1998 (Unpublished).
Glaude at al., "SS7 to IP Signaling Gateway Transport Architecture", Internet Engineering Task Force, pp. 1-39 (Nov. 27, 1998).
Michael McGrew, "Transport SS7 Signaling Over IP," Lucent Technologies Inc., p. 1-8 (Nov. 1998).
Cuervo at al., "SSS-Internet Interworking—Architectural Framework," pp. 1-9 (Jul. 1998).
Tekelec, "Eagle® Feature Guide," PN/9110-1225-01, (Jan. 1998).

O'Shea, "The Network That's Never Done," Telephony, p. 38-43, (Sep. 15, 1997).
Tekelec, "Eagle® STP Platform," 908-0134-01, (1997).
Tekelec, "STP Lan Interface Feature," 908-0134-01, (1997).
Snyder, "Rerouting Internet Traffic Jams," Telephony, p. 12, (Nov. 11, 1996).
Anonymous, "Around the Loop," Telephony, p. 26, (Jul. 22, 1996).
Woods, "Fresno Bee Still Buzzing About Wireless," TechNews, pp. 1-2 (1995).
Bellcore, "Signaling Transfer Point (STP) Generic Requirements," GR-82-CORE, Issue 1 (Jun. 1994).
Yang et al., "The Design and Implementation of a Service Logic Execution Environment Platform," IEEE, pp. 1911-1917 (1993).
Almquist, "Type of Service in the Internet Protocol Suite," Internet Engineering Task Force RFC 1349, pp. 1-28 (Jul. 1992).
Zaharychuk et al., "Gateway Signal Transfer Points: Design, Services and Benefits, "IEEE, pp. 223.2.1-223.2.8, (May 29, 1990).
El-Toumi et al., "Interconnecting SS7 Signaling Networks," AT&T Bell Laboratories, IEEE, pp. 589-593 (1990).
Bootman et al., "Generic Building Blocks for the Telecommunications Management Network," IEEE, p. 6.1.1-6.1.5, (1988).
Buckles, "Very High Capacity Signaling Transfer Point for Intelligent Network Services," IEEE, p. 40.2.1-40.2.4, (1988).
Final Official Action for U.S. Appl. No. 11/986,500 (Oct. 20, 2011).
Sidebottom et al., "SS7 MTP3-User Adaptation Layer (M3UA)," Internet Draft, draft-ietf-sigtran-m3ua-02.txt, Network Working Group, pp. 1-56 (Mar. 10, 2000).

* cited by examiner

METHODS, SYSTEMS, AND COMPUTER PROGRAM PRODUCTS FOR ORGANIZING, MANAGING, AND SELECTIVELY DISTRIBUTING ROUTING INFORMATION IN A SIGNALING MESSAGE ROUTING NODE

RELATED APPLICATIONS

This application is a divisional of U.S. patent application Ser. No. 11/084,853, filed Mar. 18, 2005 now U.S. Pat. No. 7,804,789, which claims the priority benefit of U.S. Provisional Patent Application No. 60/554,092, filed Mar. 18, 2004; the disclosures of which are incorporated herein by reference in their entireties.

TECHNICAL FIELD

The subject matter described herein relates generally to distributing routing information. More particularly, the subject matter described herein includes methods, systems, and computer program products for organizing, managing, and selectively distributing routing information in a signaling message routing node that employs a distributed internal processing architecture.

RELATED ART

Signaling message routing nodes, such as SS7 signal transfer points and SS7/IP gateways, may be implemented using distributed routing architectures in which message routing functions are located on each signaling link interface module or card. Each signaling link interface module may store it own routing table and may share link status information with other signaling link interface modules.

In an SSP-IP gateway with a distributed routing architecture, as the number of SS7 and IP signaling interfaces supported by the routing node increases, the volume of internal SS7 signaling link and IP signaling connection status messaging increases in a non-linear manner. As the amount of inter-card link status communication increase, consumption of processing resources associated with each signaling link interface and consumption of inter-processor communication subsystem resources also increase. Consequently, as a distributed routing node increases in size due to higher signaling link density, overall performance can be adversely affected by the exchange of link status messages among processors within the routing node.

With particular regard to a routing node that supports both SS7 and IP (or other non-message-transfer-part transport protocols, such as asynchronous transfer mode, etc.) communication interfaces, it will be appreciated that limitations imposed by the SS7 signaling protocol are not necessarily relevant to IP interface implementations and vice-versa. For example, a conventional SS7 signaling link interface module may correspond to a single or a small number of physical time division multiplexed (TDM) communication channels (e.g., one or more 56 kbps DS0 channels). In contrast, an IP signaling link interface may support a number of virtual signaling links over an IP interface where the number of virtual signaling links is one or more orders of magnitude greater than the number of physical TDM channels supported by a conventional TDM-based SS7 signaling link interface. Furthermore, within the SS7 protocol, signaling links are grouped into signaling linksets, where a signaling linkset may include no more than 16 individual SS7 signaling links. As there is no direct correspondence between SS7 signaling links and IP connections, the signaling linkset concept has no inherent significance in the context of IP communications. Consequently, network elements, such as an SS7/IP signaling gateway (SG), that support both types of interfaces (i.e., SS7 and IP) face not only the status information sharing issues described above, but also additional difficulties associated with the mapping of protocol-specific organizational concepts (e.g., signaling link, linkset, etc.) between the two interface types.

Accordingly, there exists a long felt need for improved methods, systems, and computer program products for organizing, managing, and selectively distributing routing information in a signaling message routing node.

SUMMARY

The subject matter described herein includes methods, systems, and computer program products for organizing, managing, and selectively distributing routing information within a signaling message routing node, such as a signaling gateway router that is adapted to route both SS7 over message transfer part (MTP) signaling messages and other IP transport based signaling protocol messages (e.g., SS7 over IP, session initiation protocol over IP, etc.). In one exemplary implementation, internal IP signaling resources are organized into a hierarchical signaling structure that includes IP connections or associations, virtual signaling links, IP destinations, SS7 routes and signaling matesets. As used herein, the term "mateset" refers to a plurality of communication modules that are grouped together for the purposes of sharing non-MTP signaling link status information. For example, communication modules that are members of the same mateset may share non-MTP signaling link status information only with other members. MTP signaling link status information may be shared with members and with communication modules that are not members of the mateset. As used herein, the term "virtual signaling links" refers to signaling links implemented over non-MTP transport, such as IP transport.

According to an aspect of the subject matter described herein, signaling link information may be distributed in a hierarchical matter using the hierarchy described above. For example, if an IP connection status change occurs, the highest signaling link entity affected by the event is determined. The term "signaling link entity" is used herein to refer generically to include any of the entities hosted by a communication module. Examples of signaling link entities include IP connections, virtual signaling links, IP destinations, SS7 routes, and matesets. A change in status associated with the highest affected entity is distributed to other communication modules. By determining and communicating the highest affected signaling link entity to other modules, routing node internal communication bandwidth and processing resources are conserved.

According to another aspect of the subject matter herein, each mateset includes a communication module that functions as a network management proxy for generating and distributing MTP network management (NM) messages to members and non-members. For example, a NM proxy may collect link status information from other members, determine that all virtual signaling links to a destination are down, and send an MTP network management message to members and non-members. In an alternate implementation, each member of a mateset may communicate its own MTP network management information to members and non-members. For example, each member may collect link status information from other members and detect link status events that are detected on card. Based on the external and internal link status information, each member may be capable of generating and distributing MTP network management messages to members and non-members. For example, if a mateset member detects that one of the virtual links that it hosts is down, the mateset member may make the determination as to whether the link is the last link to a destination. If the link is determined to be the last link to the destination, the mateset member may generate and forward an MTP network management message to members and non-members.

According to another aspect of the subject matter described herein, single SS7 NM message intended for a virtual signaling link may be replicated and distributed to one or more IP connections associated with the virtual signaling link. In one exemplary implementation, SS7 NM messages are communicated over IP connections associated with the same network type as the SS7 NM message.

The subject matter described herein may be implemented using a computer program product comprising computer executable instructions embodied in a computer readable medium. Exemplary computer readable media suitable for use with embodiments of the subject matter described herein include disk storage devices, tape storage devices, chip memory devices, application specific integrated circuits, programmable logic devices, and downloadable electrical signals. Any combination of hardware, software, and firmware for implementing the methods described herein is intended to be within the scope of the subject matter described herein.

BRIEF DESCRIPTION OF THE DRAWINGS

Preferred embodiments of the subject matter described herein will now be described with reference to the accompanying drawings of which.

DETAILED DESCRIPTION

According to one embodiment of the subject matter described herein, a signaling message routing node includes MTP and non-MTP signaling message transport capabilities and a mechanism for efficiently sharing network management information between internal MTP and non-MTP entities. The MTP transport entities may include communication modules that implement MTP levels 1-3. The non-MTP transport entities may include communication modules that implement MTP level 3 over a non-SS7 protocol, such as IP or ATM or a non-SS7 protocol, such as SIP, over IP or ATM. Furthermore, the subject matter described herein may be applied to both "homogenous" and "heterogeneous" routing systems, where a homogenous routing system is defined as a routing system that communicates using a single signaling/transport protocol suite (e.g., SS7/MTP), and a heterogeneous routing system is defined as a routing system that communicates using a combination of signaling/transport protocol suites (e.g., SS7/MTP and SS7/IP). Again, for the purposes of illustration, the description herein is focused primarily on routing node embodiments that include SS7/MTP and SS7/IP communication capabilities.

Figure 1:
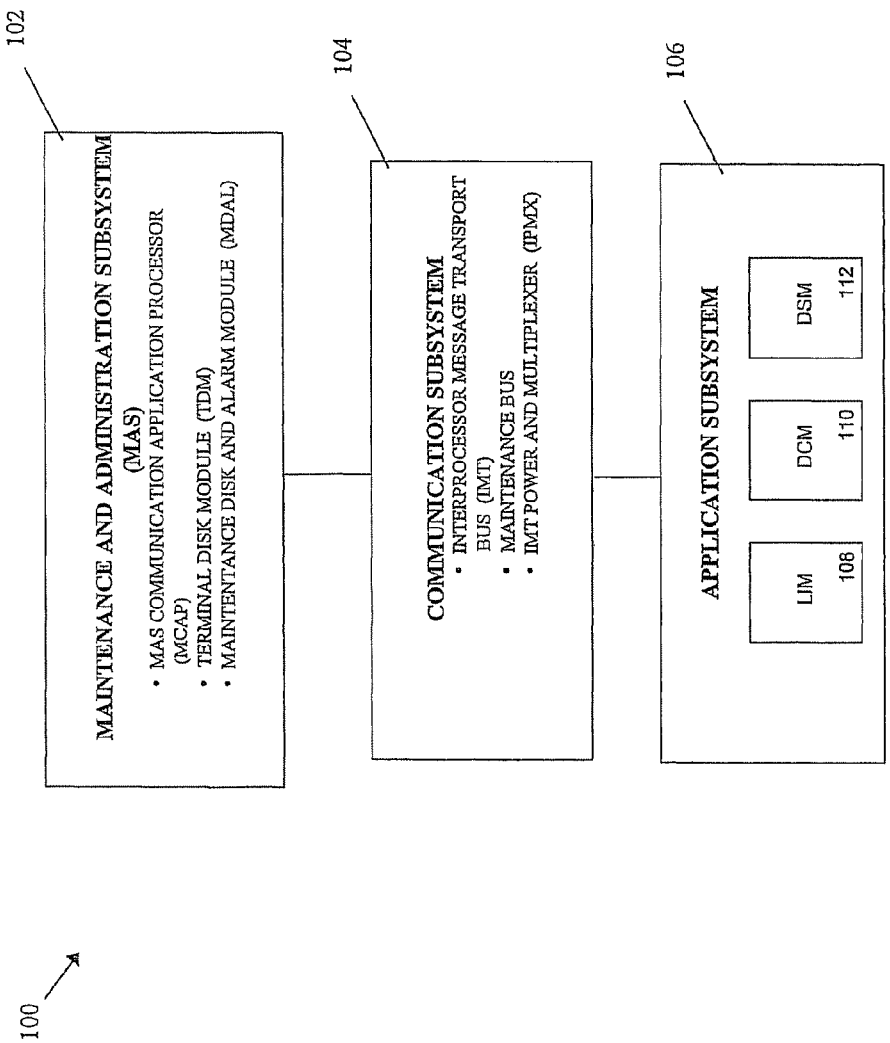
FIG. 1 is a block diagram of a signaling gateway (SG) routing node architecture suitable for use with embodiments of the subject matter described herein.

Embodiments of the subject matter described herein may include an underlying hardware platform similar to an SS7 signal transfer point (STP) or signaling gateway (SG) routing node. Exemplary STP or SG hardware platforms suitable for use with embodiments of the subject matter described herein include the EAGLE® STP and the IP[7]Secure Gateway®, both available from Tekelec of Calabasas, Calif. A block diagram that generally illustrates the base internal architecture of an IP[7] Secure Gateway® is shown in FIG. 1. In FIG. 1, SG routing node 100 includes the following subsystems: a maintenance and administration subsystem (MAS) 102; a communication subsystem 104 and an application subsystem 106. MAS 102 provides maintenance communications, initial program loading, peripheral services, alarm processing and system disks. Communication subsystem 104 includes an interprocessor message transport (IMT) bus that is the main communication bus among all subsystems in SG routing node 100. In one implementation, the IMT bus includes two 1 Gbps counter-rotating serial rings. In an alternate implementation, communication subsystem 104 may be implemented using a LAN architecture, such as an Ethernet architecture.

Application subsystem 106 includes application cards capable of communicating with the other cards through communication subsystem 104. Numerous types of application cards can be incorporated into SG 100, including: a link interface communication module (LIM) 108 that interfaces with SS7 links; a data communication module (DCM) 110 that provides an Internet protocol (IP) communication interface using transmission control protocol (TCP) or stream control transmission protocol (SCTP); and a database services module (DSM) 112 that may be configured to host any number of signaling message processing applications such as, global title translation, number portability translation service, flexible number service, and other application services. With respect to DCM communication module 110, it will be appreciated that a DCM module may be configured to support any number of signaling protocols, such as the Internet Engineering Task Force (IETF) SIGTRAN signaling protocol suite (e.g., M3UA, M2UA, SUA, etc.), transport adaptation layer interface (TALI), SIP, H.323, etc.

Figure 2:
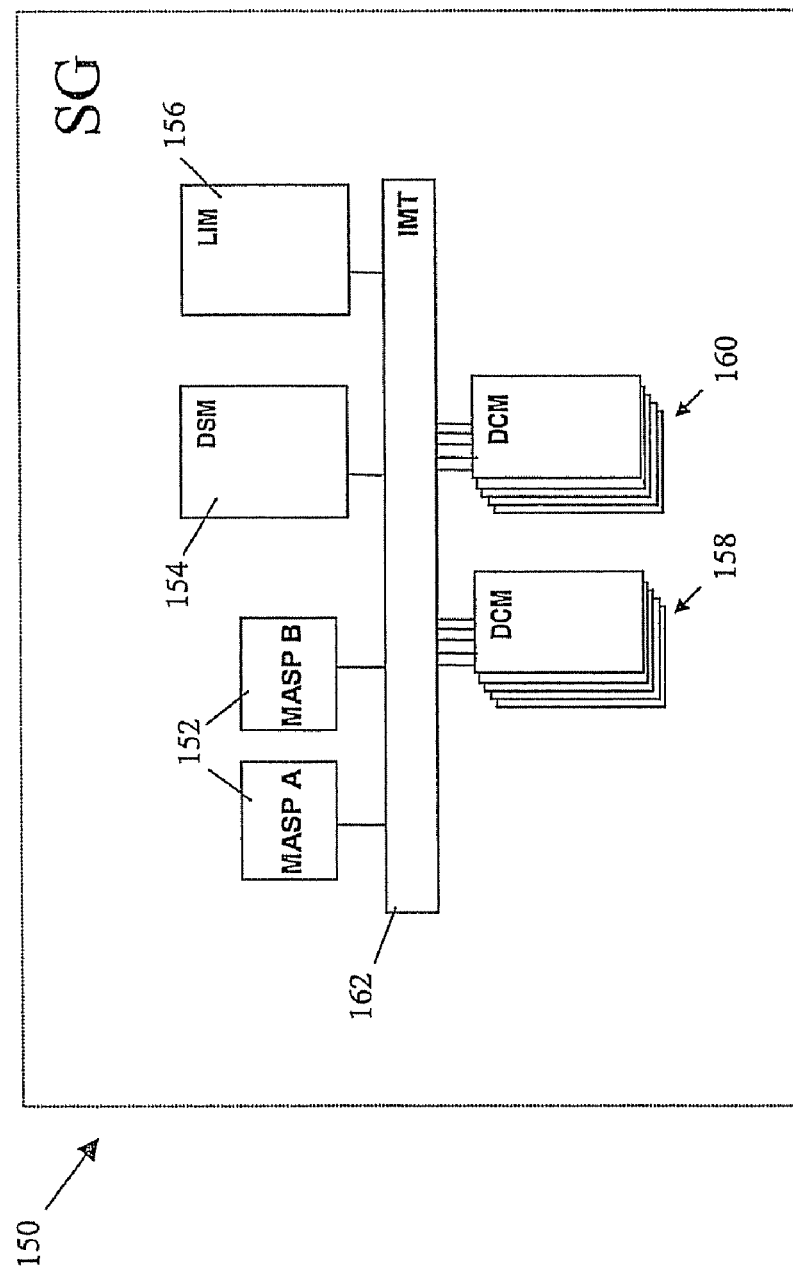
FIG. 2 is a block diagram of a routing node that includes two Internet protocol (IP)-based signaling matesets according to an embodiment of the subject matter described herein.

One aspect of the subject matter described herein involves an efficient method of organizing communication modules (e.g., DCMs and LIMs) within a signaling message routing node, such as SG 150 shown in FIG. 2, that employs a distributed processing architecture. Referring to FIG. 2, SG 150 includes a pair of maintenance and administration subsystem processors (MASPs) 152 for providing system-wide maintenance and administration support (e.g., alarms, data provisioning, administrative interface, etc.), a DSM 154 for hosting one or more signaling message processing applications, an SS7/MTP LIM 156 for sending and receiving SS7 signaling messages over MTP-based communication links, and several groups 158 and 160 of DCMs for sending and receiving signaling messages (e.g., M3UA, M2UA, SUA, SIP, or H.323 messages) over IP-based communication links. Each group of DCM modules illustrated in FIG. 1 comprises a signaling mateset (SM). In the example shown in FIG. 2, SG 150 includes two DCM matesets 158 and 160. Each LIM and DCM configured in SG 150 is connected to an internal communication bus or network 162, such that signaling, network management, and status information may be communicated amongst the various modules.

In one embodiment, SS7 LIMs, such as LIM 156, are adapted to provide MTP levels 1 through 3. In an alternate embodiment, SS7 LIM modules may provide MTP levels 1 and 2, while one or more appropriately configured DSM modules, such as DSM 154, provide centralized MTP level 3 processing (e.g., MTP routing, network management, etc.).

DCMs, such as DCMs that are members of matesets 158 and 160, may implement OSI layers 1-3 (physical, network, and transport layers), a signaling adaptation layer, and MTP level 3. In an alternate implementation, DCMs may implement OSI layers 1-3 and a signaling adaptation layer, and MTP level 3 may be implemented off card.

In one embodiment of the subject matter described herein, the communication module members of a signaling mateset may share one or more adjacent SS7 point codes. An adjacent point code is a point code that is directly connected to the opposite end of a signaling link. By "share" it is meant that the communication modules in the mateset have the same adjacent point code. These adjacent point codes may be associated with "real" signaling nodes in the SS7 network, or may be associated with virtual signaling nodes. A real signaling node refers to an SS7 node that implements at least SS7 layers 1-3. A virtual signaling node refers to an SS7 node for which SS7 layer 3 is implemented by SG 150.

A mateset may include a group of communication modules that act together to carry traffic between an SS7 network and a set of IP-based SS7 user-part applications, SS7 application part applications, or non-SS7 signaling applications. For non-SS7 applications, the use of adjacent point codes is optional. In any event, members of a signaling mateset may share the ability to transmit signaling messages to or towards a common signaling destination, where a signaling destination may be a signaling point (e.g., an SG, an STP, an end office, a tandem office, a home location register, a short message service center, a media gateway controller, a SIP server, an H.323 gateway, or a service control point (SCP)), an application server (AS) that is not SS7-based, or any other entity in a communications network that is adapted to receive a signaling message. IP connections with remote applications may utilize transmission control protocol (TCP), user datagram protocol (UDP), stream control transmission protocol (SCTP), or other suitable transport layer protocol.

Figure 3:
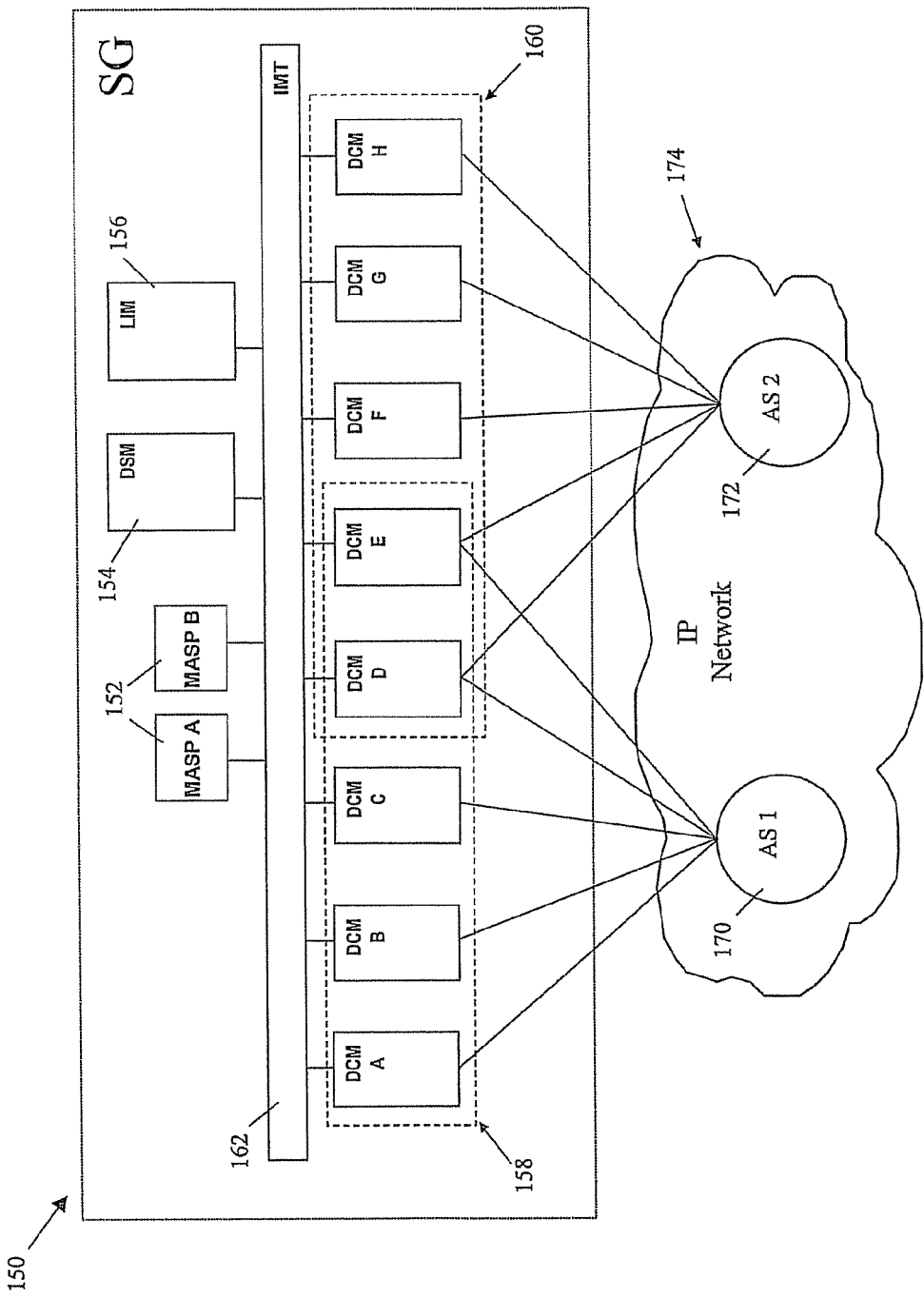
FIG. 3 is a block diagram of a routing node that includes two IP-based signaling matesets with overlapping mateset members according to an embodiment of the subject matter described herein.

Signaling matesets are referred to herein as virtual groups of communication modules because individual communication modules may be members of more than one SM. As illustrated in FIG. 3, exemplary matesets 158 and 160 share several communication module members. Mateset 158 includes five DCM communication modules, modules A, B, C, D and E, where each of these modules hosts at least one direct or indirect IP connection to AS 170. That is, AS 170 resides within an IP network 174, which may include any number, of data router elements through which a signaling message may be routed or "hopped" before indirectly arriving at the final destination. Mateset 160 also includes five DCM communication modules, modules D, E, F, G and H, where each of these modules hosts at least one direct or indirect IP connection to AS 172. Thus, DCM communication processors D and E are members of both matesets.

In one embodiment of the subject matter described herein a mateset is analogous to an SS7 signaling linkset. Those skilled in the art of SS7 signaling will appreciate that an SS7 signaling linkset is a virtual entity, defined in the SS7 signaling protocol, for the purpose of grouping up to 16 SS7 signaling links that terminate at the same adjacent SS7 signaling point. In the context of IP communications, an SS7 signaling linkset does not have any particular significance. However, embodiments of the subject matter described herein that include SS7/IP communication interfaces (e.g., DCM communication modules) make novel use of the SS7 signaling link/linkset concept by extending the SS7 link and linkset concept to IP-based communication module matesets. More particularly, each mateset is assigned a signaling mateset identifier that is analogous to an SS7 signaling linkset identifier, and each communication module that is a member of a mateset is assigned a virtual signaling link entity identifier. A virtual signaling link entity is a virtual entity that appears to SS7 LIM modules in the system as an SS7 link, while simultaneously appearing to IP-based DCM modules in the system as a collection of one or more IP connections or associations.

In one embodiment of the subject matter described herein, a signaling mateset may be mapped to an SS7 signaling linkset. For example, 16 virtual signaling link entities may appear as a signaling linkset to SS7 LIMs. Each virtual signaling link entity may reside on a different DCM. Thus, a mateset that has been mapped to an SS7 signaling linkset may include up to 16 DCM communication modules, with each DCM module supporting one virtual signaling link entity of the linkset.

One advantage of associating IP-based communication modules of a mateset with a SS7 signaling linkset/links is that such an association and organizational structure enables non-SS7/MTP communication processors to efficiently and effectively interface with other SS7/MTP communication processors in a heterogeneous signaling message routing system. That is, such an organizational structure enables non-SS7/MTP communication processors to appear to other SS7/MTP communication processors in a routing system as if they comply with SS7/MTP routing protocol conventions. As a result, many features, services, and concepts associated with traditional SS7/MTP signaling linksets/links and SS7/MTP routing may be extended to non-SS7/MTP communication interfaces. In an alternate embodiment, a signaling mateset may be mapped to two or more SS7 signaling linksets, thereby enabling a mateset to include more than 16 DCM communication modules, with each DCM module supporting one virtual signaling link entity of the linkset. In yet another embodiment, a signaling mateset may include IP communication modules, such as DCM modules, that are each adapted to host multiple virtual signaling link entities.

Exemplary SS7 LIM Communication Module Architecture

As described above, SS7 LIM 156 is adapted to provide an interface to one or more SS7 signaling links and includes a number of sub-components.

Figure 4:
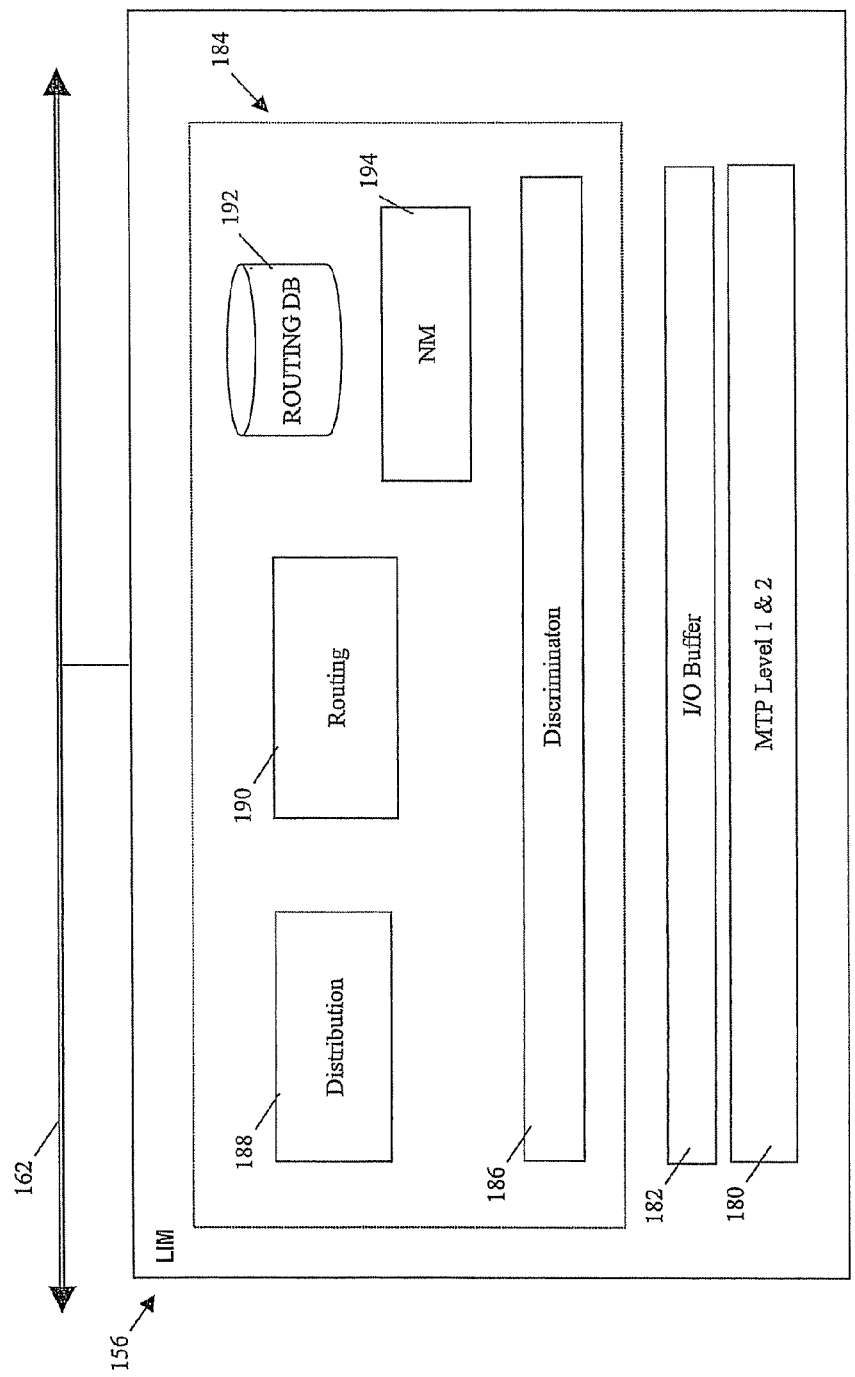
FIG. 4 is a block diagram of an exemplary SS7 link interface module (LIM) according to an embodiment of the subject matter described herein.

FIG. 4 is a block diagram illustrating an exemplary SS7 LIM suitable for use with embodiments of the subject matter described herein. As illustrated in FIG. 4, exemplary subcomponents of LIM 156 include an SS7 MTP level 1 & 2 function 180, an input/output (I/O) buffer 182, and a collection 184 of functions that provide MTP level 3 processing. More particularly, in the exemplary LIM embodiment shown, collection 184 includes a message discrimination function 186, message distribution function 188, a routing function 190, an associated routing information database 192, and a signaling network management (NM) function 194.

MTP level 1 and 2 function 180 provides the facilities necessary to send and receive digital data over a particular physical medium, as well as to provide error detection, error correction and sequenced delivery of SS7 messages. I/O buffer 182 provides for temporary buffering of incoming and outgoing SS7 signaling message packets. Message discrimination function 186 receives signaling messages from the lower processing layers and performs a discrimination function that effectively determines whether an incoming SS7 message requires internal processing or is simply to be through switched. Examples of received SS7 messages that require internal processing include signaling connection control part messages in need of global title translation, messages requiring number portability translation service, signaling network management messages, and messages requiring other application services as described above.

For SCCP messages that require GTT processing, message distribution function 188 is adapted to receive such messages from discrimination function 186 and direct the messages to a GTT-provisioned DSM processor module via IMT bus 162. This type of internal distribution of messages within an SS7/IP gateway routing node should not be confused with message routing, which refers to selecting an external signaling link over which a received message should be forwarded.

Routing function 190 is responsible for examining an incoming message received from discrimination function 186 and determining on which outbound link or virtual signaling link entity the message is to be transmitted. Outbound signaling link selection is achieved through the use of data contained in routing database 192. In one embodiment, data contained in routing database may include route and signaling link information, such as that presented in Table 1.

TABLE 1

LIM Route Information

| Destination | | | | | Linkset/ | Route | | Route |
|---|---|---|---|---|---|---|---|---|
| DPC | OPC | SI | SSN | CIC | Mateset | Cost | APC | Status |
| 1-1-1 | *-*-* | 3 | 12 | — | LS1 | 10 | 1-1-10 | Avail |
| 1-1-1 | *-*-* | 3 | 12 | — | LS2 | 20 | 1-1-20 | UnAvail |
| 7-7-7 | *-*-* | 5 | — | 0-15 | MS1 | 10 | 1-1-30 | Avail |
| | | | | | | | 1-1-40 | Avail |
| 7-7-7 | *-*-* | 5 | — | 0-15 | MS2 | 20 | 1-1-50 | UnAvail |
| | | | | | | | 1-1-60 | Avail |

Exemplary route data shown in Table 1 includes a routing or destination key, which includes a destination point code (DPC), an origination point code (OPC), a service indicator (SI), a signaling connection control part (SCCP) subsystem number (SSN), and a circuit identification code (CIC) or CIC range. It will be appreciated that Table 1 is merely illustrative of destination key information and that a destination key may include other parameters such as a carrier or network operator identifier, a quality of service indicator, a date and/or time indicator, etc.

In Table 1, each destination key entry is associated with an outbound signaling linkset or mateset identifier, a route cost parameter, one or more adjacent point code (APC) identifiers, and a route status indicator. With respect to routes involving signaling matesets, multiple real (corresponding to external nodes that implement MTP level 3) or virtual (corresponding to external nodes for which APC identifiers may be specified for each route entry, where each APC may be associated with a different network type, such as American National Standards Institute (ANSI) or International Telecommunications Union (ITU), etc. Exemplary network type association information is illustrated in Table 2. Such network type association information may be used to selectively distribute network-type-specific network management information to the appropriate matesets and adjacent point codes.

As illustrated by the sample entries in Table 1, more than one route may be configured for the same destination key, where each route to the common destination may be assigned a different route cost. The route with the lower route cost is considered the primary route and is selected preferentially over higher cost routes to the same destination. As described above, the signaling linkset identifier is a logical entity that is associated with a group of SS7 signaling links that connect to the same adjacent SS7 point code, while a signaling mateset identifier is a logical identifier associated with a group of virtual signaling link entities that are associated with the same "real" or "virtual" adjacent SS7 point code.

TABLE 2

APC Network Type Information

| APC | Network Type |
|---|---|
| 1-1-10 | ANSI |
| 1-1-20 | ANSI |
| 1-1-30 | ANSI |
| 1-1-40 | ITU |
| 1-1-50 | ANSI |
| 1-1-60 | ITU |

Table 3 contains exemplary signaling linkset/mateset definition and status information, which is used in conjunction with the routing information provided in Table 1 to route signaling messages. The data in Table 3 includes a linkset/mateset identifier, a signaling link/link entity identifier, a signaling link status indicator, and an internal communication bus/internal network address identifier associated with the communication module that supports the signaling link.

TABLE 3

LIM Signaling Link Information

| LinkSet/ Mateset | Link/ Link Entity | Link Status | IMT Bus Address |
|---|---|---|---|
| LS1 | SL1 | Avail | 1410 |
| | SL2 | UnAvail | 2410 |
| | SL3 | Avail | 3410 |
| LS2 | SL1 | UnAvail | 1412 |
| | SL2 | UnAvail | 2412 |
| MS1 | SLE1 | Avail | 4210 |
| | SLE2 | Avail | 5210 |

TABLE 3-continued

LIM Signaling Link Information

| LinkSet/<br>Mateset | Link/<br>Link Entity | Link<br>Status | IMT Bus<br>Address |
|---|---|---|---|
| MS2 | SLE1 | UnAvail | 1410 |
|  | SLE2 | UnAvail | 1412 |

From an operational perspective, the routing of an SS7 signaling message that is received by routing function 190 involves the accessing of route and link data such as that described above with respect to Tables 1, 2 and 3. More particularly, routing function 190 may access route and link information in database 192 using information extracted from the received SS7 signaling message. Once a matching destination routing key has been determined, a specific signaling link is selected and routing function 190 is further adapted to internally transfer the message to the outbound communication module (e.g., LIM or DCM) associated with the selected signaling link via IMT bus 162. It will be appreciated that a signaling link selector (SLS) parameter that is contained in an SS7 signaling message may be used to select a specific signaling link within a signaling linkset for outbound transmission of the message.

MTP level 3 signaling network management function 194 may receive, process, and generate messages associated with the management and administration of a signaling network. Network management function 194 is adapted to operate in concert with routing function 190 to maintain and provide the status of signaling links associated with various signaling point destinations in a network. In practical terms, the link status information provided by NM function 194 prevents the associated routing function 190 from selecting a route/outbound signaling linkset that is unavailable. Individual SS7 signaling link status information is distributed among communication modules that are connected to, IMT bus 162. Each SS7 LIM communication module is adapted to maintain status information associated with the signaling links that it hosts (i.e., the links that are directly connected to the LIM), to distribute this SS7 signaling link status information to other communication modules in the system and to receive signaling link status updates from other communications modules (e.g., LIMs or DCMs) in the system.

Exemplary IP DCM Communication Module
Architecture

Figure 5:
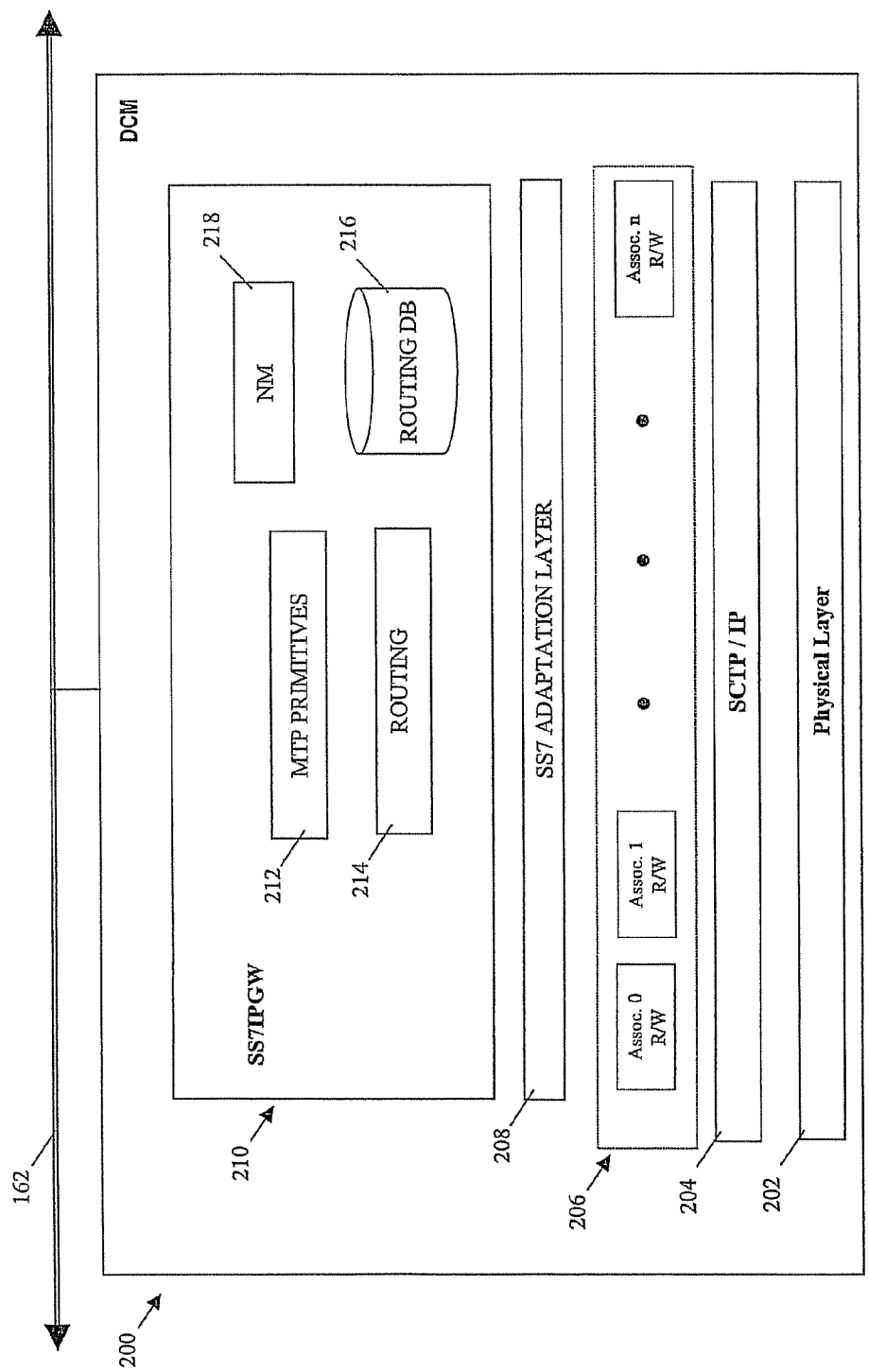
FIG. 5 is a block diagram of an exemplary IP data communication module (DCM) according to an embodiment of the subject matter described herein.

FIG. 5 illustrates a data communication module according to an embodiment of the subject, matter described herein. In FIG. 5, DCM 200 may be used to provide the communication interface between a routing node and a remote application, between routing nodes, or between a routing node and any external node capable of sending and receiving SS7 messages over an IP network.

As indicated in FIG. 5, DCM 200 is connected to IMT communication bus 162 and includes a number of functional processes. These processes include a physical layer 202 for performing physical layer functions and a stream control transmission protocol/Internet protocol (SCTP/IP) layer 204 for implementing SCTP/IP protocol functions. DCM 200 also includes a plurality of SCTP/IP read/write processes 206 for buffering and performing basic input/output (I/O) type operations for each association. An SS7 adaptation layer function 208 is provided for appending appropriate header/trailer information to outbound message packets and for removing header/trailer information from inbound message packets. SS7IPGW application layer 210 is adapted to process both inbound and outbound signaling messages. Functions or layers 208 and 210 may support any number of SS7 signaling adaptation protocols, such as Tekelec's transport adapter layer interface (TALI), M2PA, M3UA, M2UA, SUA, or other adaptation layer protocols, as described in the correspondingly named IETF SIGTRAN Internet Drafts and RFCs. In the example shown in FIG. 5, SS7IPGW application layer 210 includes an SS7 MTP primitives function 212 for performing adaptation translation processing, a routing function 214, a routing information database 216, and a network management function 218. In one embodiment, MTP primitives function 212 facilitates the mapping or translation of SS7-MTP formatted signaling messages into SIGTRAN formatted signaling messages (e.g., M2PA, M3UA, M2UA, SUA, etc.), and vice-versa. For example, MTP primitives function 212 may be adapted to map or translate an SS7 ISDN user part (ISUP) call setup message into a corresponding IETF SIGTRAN M3UA signaling message. Such mapping functionality may be applied to network management messages, user part messages and application part messages. The subject matter described herein is not limited to the above referenced SS7 adaptation layer protocols, as other functionally similar SS7 adaptation layer protocols may be employed without departing from the scope of the invention.

In one embodiment, network management (NM) function 218 is adapted to receive, process, and generate SS7 network management messages on behalf of remote signaling destinations that reside in an IP network. NM function 218 is adapted to access and update routing information contained in database 216 in response to SS7 network events and IP network events, including signaling link/link entity, IP destination, route, and IP connection status changes. NM function 218 is also adapted to selectively distribute network management information associated with a first network type, such as an American National Standards Institute (ANSI) network, to only those IP connections that are servicing ANSI-capable IP destinations. As such, those IP connections that are servicing only a second network type (e.g., an ITU network) would not receive the ANSI network management information. It will be appreciated that a single IP connection may be adapted to service multiple network types, and in this case NM function 218 may distribute NM information associated with multiple network types to the same IP connection.

Routing function 214 may perform MTP level 3 routing functions as described above with regard to LIM 156. Routing database 216 may include routing or destination key information, which is similar to that described above with regard to Table 1. An exemplary DCM route table is presented below in Table 4. In Table 4, each entry includes a multi-parameter routing or destination key, a linkset/mateset identifier, a route cost indicator, an adjacent point code identifier, and a route status indicator.

TABLE 4

DCM Route Information

| Destination | | | | | Linkset/ | Route | | Route |
|---|---|---|---|---|---|---|---|---|
| DPC | OPC | SI | SSN | CIC | Mateset | Cost | APC | Status |
| 1-1-1 | *-*-* | 3 | 12 | — | LS1 | 10 | 1-1-10 | Avail |
| 1-1-1 | *-*-* | 3 | 12 | — | LS2 | 20 | 1-1-20 | UnAvail |
| 7-7-7 | *-*-* | 5 | — | 0-15 | MS1 | 10 | 1-1-30 | Avail |
|  |  |  |  |  |  |  | 1-1-40 | Avail |
| 7-7-7 | *-*-* | 5 | — | 0-15 | MS2 | 20 | 1-1-50 | UnAvail |
|  |  |  |  |  |  |  | 1-1-60 | Avail |

As stated above, a signaling mateset may include a group of DCM communication modules that have an association with the same adjacent point code(s). An adjacent point code may be associated with a "real" signaling node in the network or may be associated with a virtual signaling node. With respect to routes involving signaling matesets, multiple real or virtual APC identifiers may be specified for each route entry, where each APC may be associated with a different network type, such as ANSI or International Telecommunications Union (ITU), etc. Exemplary network type association information is illustrated in Table 5.

TABLE 5

APC Network Type Information

| APC | Network Type |
|---|---|
| 1-1-10 | ANSI |
| 1-1-20 | ANSI |
| 1-1-30 | ANSI |
| 1-1-40 | ITU |
| 1-1-50 | ANSI |
| 1-1-60 | ITU |

Members of a signaling mateset also share the ability to transmit signaling messages to or towards a common signaling destination, where a signaling destination may be a signaling point (e.g., an SG, an STP, an end office, a tandem office, a home location register, a short message service center, a media gateway controller, a SIP server, an H.323 gateway, or a service control point (SCP)), an application server (AS), or any other entity in a communications network that is adapted to receive a signaling message.

Table 6 shown below illustrates DCM signaling link information, which is similar to SS7 LIM signaling link information described above with respect to Table 3. Table 6 contains exemplary signaling linkset/signaling mateset definition and status information, which is used in conjunction with the routing information provided in Table 4 to route signaling messages via an IP-based DCM module. In Table 6, each entry includes a linkset/mateset identifier, a signaling link/link entity identifier, a signaling link status indicator, and an internal communication bus/internal network address identifier associated with the communication module that supports the signaling link or link entity. It will again be appreciated that signaling links associated with signaling matesets are virtual entities and that a virtual SS7 signaling link entity associated with a DCM communication module may host multiple IP connections or associations (e.g., SCTP associations, TCP connections, etc.) that constitute direct or indirect connections to a common signaling destination.

TABLE 6

DCM Signaling Link Information

| LinkSet/ Mateset | Link/ Link Entity | Link Status | IMT Bus Address |
|---|---|---|---|
| LS1 | SL1 | Avail | 1410 |
|  | SL2 | UnAvail | 2410 |
|  | SL3 | Avail | 3410 |
| LS2 | SL1 | UnAvail | 1412 |
|  | SL2 | UnAvail | 2412 |
| MS1 | SLE1 | Avail | 4210 |
|  | SLE2 | Avail | 5210 |
| MS2 | SLE1 | UnAvail | 1410 |
|  | SLE2 | UnAvail | 1412 |

Table 7 shown below illustrates exemplary data that may be used by DCM 200 to maintain IP connection status associated with virtual signaling link entities of a mateset. The exemplary IP connection information presented in Table 7 includes a mateset identifier, a virtual signaling link entity identifier, a local host identifier, a local port identifier, a remote host identifier, a remote port identifier, and a connection/association status indicator. In one embodiment, connection/association status indicator values may include "available", "unavailable", and "congested." A mateset identifier in Table 6 may be used as an index to a particular entry in the IP connection/association data structure (Table 7). It will be appreciated from the exemplary data presented in Table 7 that one virtual signaling link entity may be associated with multiple IP connections. For example, one virtual signaling link entity may include multiple IP connections or associations to a particular application server (AS), where each IP connection terminates on a different application server processor (ASP) associated with the AS. In such cases, the selection of a particular one-of-many IP connections associated with the same virtual signaling link entity may be based on a load-sharing algorithm (e.g., round robin based, cost function based, etc.) or by a signaling message attribute (e.g., a signaling link selection parameter).

TABLE 7

IP Connection Table

| MateSet | Link Entity | Conn ID | Local Host | Local Port | Remote Host | Remote Port | Connection Status |
|---|---|---|---|---|---|---|---|
| MS1 | SLE1 | Conn1 | Tek1a | 5000 | AHost1a | 5000 | Avail |
|  | SLE1 | Conn2 | Tek1b | 5001 | AHost1b | 5001 | Avail |
|  | SLE1 | Conn3 | Tek1c | 5002 | AHost1c | 5002 | Avail |
| MS1 | SLE2 | Conn4 | Tek2a | 6000 | AHost2a | 6000 | Avail |
|  | SLE2 | Conn5 | Tek2b | 6001 | AHost2b | 6001 | Avail |
| MS2 | SLE1 | Conn6 | Tek3a | 7000 | BHost1a | 7000 | UnAvail |
|  | SLE1 | Conn7 | Tek3b | 7001 | BHost1b | 7001 | UnAvail |
| MS2 | SLE2 | Conn8 | Tek4a | 7002 | BHost2a | 7002 | UnAvail |
|  | SLE2 | Conn9 | Tek4b | 7003 | BHost2b | 7003 | UnAvail |
|  | SLE2 | Conn10 | Tek4c | 7004 | BHost2c | 7004 | UnAvail |
|  | SLE2 | Conn11 | Tek4d | 7005 | BHost2d | 7005 | UnAvail |

In one embodiment of the subject matter described herein, one or more network type identifiers are associated with each IP connection that is defined in Table 7. Exemplary IP connection-level network type associations are shown in Table 8 below. For example, as illustrated in Table 8, IP connection Conn1 is adapted to communicate with both ANSI and ITU signaling network elements. This IP connection-level network type association information is particularly useful with respect to network management operations, where a network management message associated with a particular type of network (e.g., ANSI, ITU, etc.) must be distributed to all IP signaling destinations associated with that network type. For example, an event in an associated SS7 ANSI network may result in the generation of an ANSI SS7 network management message, which must be communicated to some or all ANSI-capable IP signaling destinations. In this case, information contained in Table 8 may be used to determine over which IP connections the network management message should be communicated (i.e., Conn1, Conn2, Conn4, Conn6, Conn7, Conn11).

TABLE 8

IP Connection Network Type Information

| Connection ID | Network Type |
| --- | --- |
| Conn1 | ANSI |
| Conn1 | ITU |
| Conn2 | ANSI |
| Conn3 | ITU |
| Conn4 | ANSI |
| Conn5 | ITU |
| Conn6 | ANSI |
| Conn7 | ANSI |
| Conn8 | ITU |
| Conn9 | ITU |
| Conn10 | ITU |
| Conn11 | ANSI |

In one exemplary implementation, each mateset member may determine and communicate the highest hierarchical level of signaling link entity affected by a change in status and communicate that level of information to mateset members and non-members. For example, in the case of the DCM module at IMT bus address 1412, which hosts the virtual signaling link entity SLE2 of mateset MS2, it will be appreciated from Table 7 that this particular DCM module actually associates four IP connections with the virtual signaling link entity SLE2. It will be further appreciated from Table 4 that mateset MS2 is adapted to provide a signaling route to the IP destination defined as "DPC: 6-6-6, OPC: ***, SI: 5, SSN: CIC: *". Thus, in the case that the DCM mateset member at IMT bus address 1412 simultaneously loses all four IP connections to the given IP destination, the mateset member need only generate and distribute a single status information update message, which indicates that SLE2 is unavailable, rather than indicating that the underlying IP connections are unavailable. By automatically determining and communicating the highest-level signaling link entity affected by a status change, the subject matter described herein conserves communications module processing resources and inter-module communication system bandwidth.

Routing function 214 is adapted to access routing information similar to that contained in Tables 4-8 and use this information to select the appropriate outbound communication module, signaling link, and in some cases the appropriate IP connection or association. That is, in the case that an inbound signaling message is directed to an outbound SS7 LIM module, an outbound SS7 signaling link is selected. In the case that an inbound signaling message is directed to an outbound IP DCM module, an outbound signaling link may be selected and/or an outbound IP connection or association may be selected. For example, when an MSU is received by an SS7 LIM for through-switched routing, an SS7 route is selected based upon parameters contained in the MSU, such as the DPC, OPC, SI, SSN, CIC, etc. The routing function selects an available route having the lowest cost (Table 1). If no route is available, then the MSU is discarded or returned, and a response method transfer prohibited (TFP) network management message is generated. If an available route is selected, then by definition, an outbound linkset is selected. If the linkset includes signaling links hosted by IP communication modules, then the selected route involves a signaling mateset. If the mateset comprises more than one virtual signaling link entity, then an available virtual signaling link may be selected using the SLS value of the MSU (Table 4). Once a virtual signaling link is selected, the MSU is delivered to the appropriate outbound IP communication module that hosts the selected virtual signaling link entity.

Once the MSU arrives at the outbound IP communication module, an available routing key is selected using parameters from the MSU such as DPC, OPC, SI, SSN, CIC, etc (Table 4). In one embodiment, the routing key search involves a hierarchical algorithm, which may involve multiple matching routing keys for a given MSU, only one of which is chosen, based on availability and routing key priority. If no matching routing key is found, then the MSU is rerouted to another communication module if possible, otherwise it is discarded and a network management message is generated. It will be appreciated such rerouting may involve attempting to reroute the MSU to another member of the mateset or rerouting the MSU to a communication module that is not a member of the mateset. In the latter case, the communication module may be another IP communication module or an SS7 LIM communication module.

A routing key is considered to be available if it is assigned at least one IP connection that is available to the mateset of the card performing the routing. If no available routing key is found for the MSU, then the MSU is rerouted if possible. Otherwise, the MSU is discarded and a network management message is generated. If an available routing key is found, and the routing card hosts one or more available IP connections (Table 7) for the routing key, then an IP connection is selected using the SLS of the MSU, and the MSU is transmitted on the selected IP connection. If an available routing key is found, but the routing card lacks an available IP connection for the routing key and the MSU has not already been "double-hopped", then the routing card selects an available mate card in the signaling mateset using the SLS of the MSU, marks the MSU as being "double-hopped" and sends the MSU to that mate for transmission. If an IP communication module receives a "double-hopped" message and is unable to route the message, then it discards the message and generates the appropriate SS7 network management message(s).

As discussed above, routing information maintained by SS7 LIM modules in a routing system of the subject matter described herein does not include IP connection information. One advantage of such an operational architecture is the minimization of internal status messaging bandwidth requirements within the routing system. More specifically, status information associated with every IP connection in the routing system does not need to be communicated to every other communication module in the system. Instead, only signaling link status and virtual signaling link entity status information is exchanged between all communication modules. IP connection information is shared only among communication modules that are members of the same signaling mateset. In any event, an inbound SS7 LIM module does not maintain IP connection information, but instead only maintains signaling link and virtual signaling link entity status information. Consequently, in the case of an inbound signaling message that is to be routed through an outbound DCM, the inbound LIM module that receives the signaling message need only to select an outbound signaling link entity. The signaling message is transferred to the outbound DCM module 200, which for the purposes of illustration is assumed to correspond to the selected signaling link entity. Upon receiving the signaling message, routing function 214 is adapted to further determine the specific IP connection over which the signaling message is to be transmitted, based on the selected signaling link entity. Other factors or parameters that may be used by routing function 214 to select a specific outbound IP connection may include destination key parameters (as described above), a carrier or network operator identifier, a quality of service indicator, a date/time of day indicator, a signaling link selection (SLS) parameter, a calling party identifier, and a called party identifier.

In order to share IP connection and destination status information among mateset members, the network management function associated with each mateset member may implement a mateset protocol. The mateset protocol may allow each member to communicate IP connection status, virtual signaling link status, and IP destination status to mateset members. In one implementation, each member may be configured with a list of mateset members and corresponding bus or network addresses so that mateset protocol messages can be distributed to the addresses of each member. In an alternate implementation, each mateset may include a unique multicast address. When a mateset member detects a change in signaling entity status information that affects only mateset members, the mateset member may formulate a mateset protocol message indicating the change in status and send the message to the mateset members. When a mateset member detects a change in signaling entity status that affects members and non-members, the mateset member may send a broadcast message indicating the change in status over the internal communications bus or network of the routing node. Alternatively, the mateset member may be configured with a list of all communication modules within the system and send messages individually addressed to each module. As will be described in more detail below, when a signaling entity status change that affects non-members is detected, a mateset may include a designated proxy or controller to distribute the status information.

Status Information Sharing Hierarchy

As described above, one advantage of a routing system of the subject matter described herein is the efficient manner in which network and/or routing status information is shared among communication modules (and application modules (i.e., modules that do not interface directly with signaling links)) in the system. A unique status information sharing hierarchy is defined within a distributed routing system of the subject matter described herein, which effectively minimizes the amount of internal communication bus/network bandwidth resources consumed by the selective sharing of status information within the system. Changes in SS7 route status, as well as changes in virtual signaling link entity status may be shared among all communication modules (e.g., LIMs or DCMs) in a distributed routing system. This information is considered to be MTP-related routing status information and may also be shared with application processor modules (e.g., DSMs) in the system that are configured to perform MTP routing processing. Changes in IP destination and IP connection status may be shared only among communication modules that are members of the same mateset and not with other MTP-based communication modules in the system, as this routing status information is not considered to be MTP-related routing status information. For example, a first mateset of communication modules is adapted to exchange virtual signaling link entity status information with a second mateset of communication modules, but individual IP connection status information associated with a virtual signaling link entity belonging to the first mateset is not shared with any members of the second mateset.

IP destination status information, such as that shown below in Table 9, may be maintained on a DCM communication module, and changes in IP destination status may be shared among all members of a signaling mateset. IP destination status information may be derived from the aggregate status of associated routing key information, such as that contained in Table 4, and the status of each routing key entry may be derived based on the aggregate status of assigned IP connection hosted by the DCM module (Table 7). Each mateset member is adapted to share its IP destination status information with other members of the mateset, so that each mateset member is not required to derive the IP destination status information associated with its mates. In certain operational scenarios, this IP destination status sharing technique saves significant CPU resources, as each DCM module is required to derive only its own IP destination status information. By sharing IP destination status information rather than routing key or IP connection status information the volume of status messages communicated in the SG system may be significantly reduced, which conserves valuable internal bus/network bandwidth.

According to another aspect of the subject matter described herein, mateset members are adapted to determine when the mateset route status must be changed and NM procedures invoked (e.g., TFA, TFP), as well as when any user-part network management procedures (user part unavailable, unitdata service message, etc.) should be invoked.

TABLE 9

DCM IP Destination Status Information

| Destination | | | | | |
|---|---|---|---|---|---|
| DPC | OPC | SI | SSN | CIC | Status |
| 7-7-7 | *-*-* | 5 | — | 0-15 | Avail |

Accordingly, a communication module belonging to a first mateset is adapted to communicate a change in status of an associated virtual signaling link entity upon loss of the last IP connection that is associated with that signaling link entity. That is, a virtual signaling link entity "unavailable" status message is communicated to all other communication and routing-equipped application modules in the system. Upon initiation of the first IP connection that is associated with that signaling link entity, an "available" status is communicated to all other communication and routing-equipped application modules in the system. The communication module may also communicate a change in congestion status of a signaling link entity to other communication and routing-equipped application modules in the system in response to a change in the availability or congestion status of one or more IP connections associated with the signaling link entity. For example, if half of the IP connections associated with a virtual signaling entity fail, the communication module hosting the virtual signaling entity may communicate a change in congestion status for that signaling link entity to other modules in the system.

In an extension of the method described in the preceding paragraph, each mateset member or a designated proxy for the mateset may main thresholds for controlling distribution of signaling entity status information among mateset members. For example, a mateset member may maintain an IP connection availability or unavailability threshold with regard to a destination and determine when the number of available or unavailable connections has a predetermined relationship with regard to the threshold. When the condition is satisfied, the mateset member may communicate a destination status change message to mateset members. In a further example, if a predetermined number of the IP connections to a destination become unavailable, a mateset member may indicate to other mateset members that the destination is congested or unavailable. The predetermined number may range from one to all of the IP connections to the destination. In another example, destination availability may not be communicated to other mateset members until at least a predetermined number of IP connections to the destination become available. The predetermined number may range from one to all of the IP connections to the destination.

With regard to the sharing of IP connection status information, as described above, this status information is shared only among communication modules that are members of the same signaling mateset. More particularly, the loss of an IP connection prompts the communication of IP connection status "unavailable" information to all communication modules that are members of the associated mateset. The initiation of an IP connection prompts the communication of IP connection status "available" information to all communication modules that are members of the associated mateset, and with regard to IP connection congestion, in one embodiment, congestion status information associated with individual IP connections within a mateset may be shared with other members of the mateset, but not with modules outside of the mateset. In an alternate embodiment, IP congestion status information is not shared among members of the same mateset. Instead, congested IP connections are simply failed after a predetermined congestion period, and "unavailability" status information is communicated to other members of the associated mateset.

As discussed above, a single virtual signaling link entity may have a large number of associated IP connections, where each of these IP connections is either directly or indirectly connected to a signaling destination. The simultaneous or near-simultaneous failure of a small number of these IP connections does not consume a significant amount of internal bus/network bandwidth and status information processing resources. However, if all IP connections associated with a signaling link entity become simultaneously or near-simultaneously unavailable, the simultaneous sharing of status change information for each IP connection can become burdensome from an internal communication bus/network standpoint, as well as status information processing resource standpoint. The subject matter described herein addresses this problem by communicating IP connection status information at the highest possible hierarchical level among members of a signaling mateset. That is, rather than sharing IP connection specific status change information in the event of the loss of every IP connection associated with an IP destination, a mateset member is adapted to determine the highest hierarchical level with which a status change event may be associated. Once this hierarchy level determination has been made by the mateset member, status information relative to that hierarchy level is communicated to other communication modules in the distributed routing system. In this example, the highest hierarchy level is the IP destination level, since all IP connections associated with a particular IP destination have failed. Consequently, rather than explicitly notifying all other members of the mateset that multiple IP connections have been lost, the affected mateset member is adapted to communicate status change information associated with the unavailable or unreachable IP destination. By doing so, the amount of status information that must be communicated among members of the mateset is significantly reduced, and consequently so is the amount of internal communication bus/network bandwidth consumed by this task. It will also be appreciated that it requires significantly less communication processor resources to receive and process a single "IP destination unavailable" status update message than to receive and process multiple "IP connection unavailable" status update messages, when both effectively convey the same information. Upon receiving an "IP destination unavailable" status update message from another member of the mateset, each communication module is adapted to update associated IP connection status information in their routing databases.

For example, with respect to DCM 200 and the sample data presented above in Tables 4-8, if IP connection Tek1*a* fails, the connection is marked as unavailable in routing DB 216, and NM function 218 is adapted to generate an IP connection "unavailable" status change message associated with connection Tek1*a* that is distributed to all other communication modules that are members of the mateset. Upon receipt of the IP connection-level status change message, each communication module member of the mateset is adapted to update its respective routing databases so as to mark the Tek1*a* connection as being unavailable. No status change update messages associated with the failure of Tek1*a* are distributed to communication modules outside of the mateset.

In the event that IP connections Tek1*a*, Tek1*b* and Tek1*c* fail simultaneously or near-simultaneously, NM function 218 is adapted to generate a single signaling link entity "unavailable" status change message associated with SLE1 that is distributed to all other communication modules in the routing system. Upon receipt of the signaling link level status change message, each communication module in the system is adapted to update their respective routing databases so as to mark the SLE1 signaling link entity as being unavailable. Members of the mateset with which SLE1 is associated are further adapted to mark each of the Tek1*a*, Tek1*b*, and Tek1*c* connections as being unavailable.

Continuing upwards in the status level hierarchy, it will be appreciated that if every IP connection associated with every signaling link entity in a signaling mateset fails and becomes unavailable, a mateset "unavailable" status change message may be generated and distributed to all communication modules in the routing system. For example, in the event that IP connections Tek1*a*, Tek1*b*, and Tek1*c* associated with SLE1, as well as Tek2*a* and Tek2*b* associated with SLE2 of mateset MS1 all fail and become simultaneously or near-simultaneously unavailable, then NM function 218 is adapted to generate a single mateset "unavailable" status change message associated with MS1 that is distributed to all other communication modules in the routing system. Upon receipt of the mateset-level status change message, each communication module in the system is adapted to update their respective routing databases so as to mark all destination or routing keys associated with the signaling mateset MS1 as being unavailable.

In one embodiment of the subject matter described herein, messages may continue to be sent to a mateset member with a failed virtual signaling link entity, despite the fact that the mateset member has notified other communication modules in the system of the failure. In this case, the mateset member with the failed signaling link entity is adapted to redirect a received MSU to a second communication module (e.g., DCM, LIM, etc.) with a viable route to the intended MSU destination, thereby causing the MSU to be internally double-hopped during the routing process. The MSU may be marked as having been double-hopped, and may be discarded if the second communication module is unable to reach the intended MSU destination. In the event of a discard, appropriate SS7 NM procedures may also be invoked by the second communication module.

Figure 6:
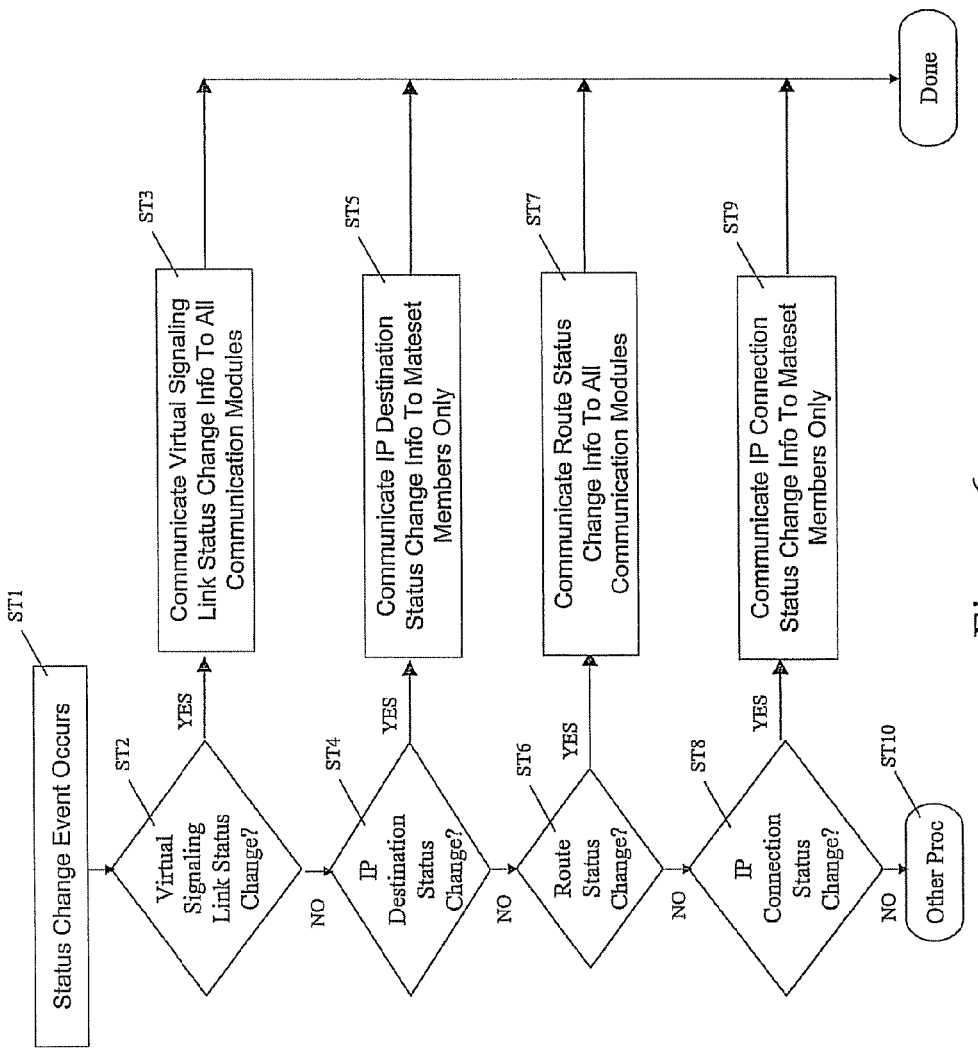
FIG. 6 is a flow chart that illustrates a signaling information processing hierarchy according to an embodiment of the subject matter described herein.

FIG. 6 is a summary process/decision flow diagram that illustrates an exemplary status information sharing hierarchy associated with a routing node of the subject matter described herein. Beginning with step ST1, a status change event occurs, such as for example, the failure of an IP connection. In step ST2, a check is made to determine whether the failed IP connection was the last available IP connection associated with a virtual signaling link entity. If the failed IP connection was the last available IP connection associated with the virtual signaling link entity, then it will be appreciated that the change in IP connection status causes an associated change in status of the virtual signaling link entity. As such, a NM message is generated and distributed to all communication modules in the routing system, informing them that the virtual signaling link entity is now unavailable (ST3). If the failed IP connection was not the last available IP connection associated with the virtual signaling link entity (i.e., does not cause a change in virtual signaling link entity status), a check is made to determine whether the failed IP connection was the last available IP connection associated with an IP destination (ST4). If the failed IP connection was the last available IP connection associated with an IP destination, then it will be appreciated that the change in IP connection status causes an associated change in status of the IP destination. Consequently, a NM message is generated and distributed to all communication module members of the mateset with which the failed IP connection is associated, informing them that the IP destination is now unavailable (ST5). If the failed IP connection was not the last available IP connection associated with an IP destination, a check is made to determine whether the failed IP connection was the last available IP connection associated with a route to an IP destination (ST6). If the failed IP connection was the last available IP connection associated with a route to an IP destination, a NM message is generated and distributed to all communication modules in the routing system, informing them that the route is now unavailable (ST7). If the failed IP connection was not the last available IP connection associated with a route to an IP destination, a check is made to determine whether the status change event is associated with a failed IP connection (ST8). If the status change event is associated with a failed IP connection, a NM message is generated and distributed to all communication module members of the mateset with which the failed IP connection is associated, informing them that the IP connection is now unavailable (ST9). If the status change event is not associated with a failed IP connection, an alternate NM action may be taken by the system (ST10).

SS7 Network Management

A signaling gateway router of the subject matter described herein is adapted to implement SS7 routing management procedures, which are intended to allow the router to notify adjacent SS7 signaling points of routing problems. When an SS7 route fails, a routing management message, such as a transfer-prohibited (TFP) or a transfer-cluster-prohibited (TCP), is sent by the SG to adjacent SS7 signaling points to advise them that the SG can no longer deliver messages to destinations that are serviced by the failed route and that another route to these destinations should be utilized. When the route becomes available, a route management message, such as a transfer-allowed (TFA) or a transfer-cluster-allowed (TCA), is sent to the adjacent SS7 signaling points, advising them that the previously problematic route is once again available. In a similar manner, when an SS7 route becomes congested, a routing management message (i.e., a transfer controlled (TFC) message) is sent by the SG to the originator of any message that attempts to access the route, thereby notifying the message originator of the congestion problem and requesting that congestion abatement procedures be implemented. In the event that a user part (e.g., SCCP global title translation) becomes unavailable, a user part unavailable (UPU) network management message is sent to the originator of any message that attempts to access the failed user part, thereby notifying the message originator of the problem. If the SG determines that messages to a destination should no longer be routed to the destination via the SG, then a network management message, such as a transfer-restricted (TFR) or a transfer-cluster-restricted (TCR), is sent by the SG to adjacent SS7 signaling points to advise them that the SG can no longer deliver messages to the affected destination and that another route to the destination should be utilized.

An SG routing node of the subject matter described herein is adapted to provide SS7 network management service for remote applications residing in an IP network. Examples of remote applications include a media gateway controller, media gateway, a softswitch, a SIP server, an H.323 gateway, a mobile service node (e.g., home location register, mobile switching center, short message service center, equipment identity register, authentication center, etc.), a service control point (SCP), a telecommunications database server, and an SS7 user part application. As described above, collections of DCM communication modules associated with signaling matesets are adapted to provide distributed connectivity to remote applications in an IP network, while appearing as virtual SS7 signaling entities to other SS7 communication modules in the routing system. In one embodiment, a signaling mateset is also responsible for serving as a collective SS7 network management proxy on behalf of one or more of these IP-based remote applications.

One challenge associated with the implementation of a distributed SS7 network management proxy function involves determining which of the mateset members should generate the necessary SS7 network management message when an associated route, destination, or user part experiences problems. According to one embodiment of the subject matter described herein, one member of each signaling mateset is designated to be an SS7 network management (NM) controller, and all SS7 network management administration is handled by these SS7 NM controllers. By analyzing IP connection status information that is shared among members of a mateset, the SS7 NM controller of the mateset is adapted to generate SS7 NM messages on behalf of the other mateset members.

Figure 7:
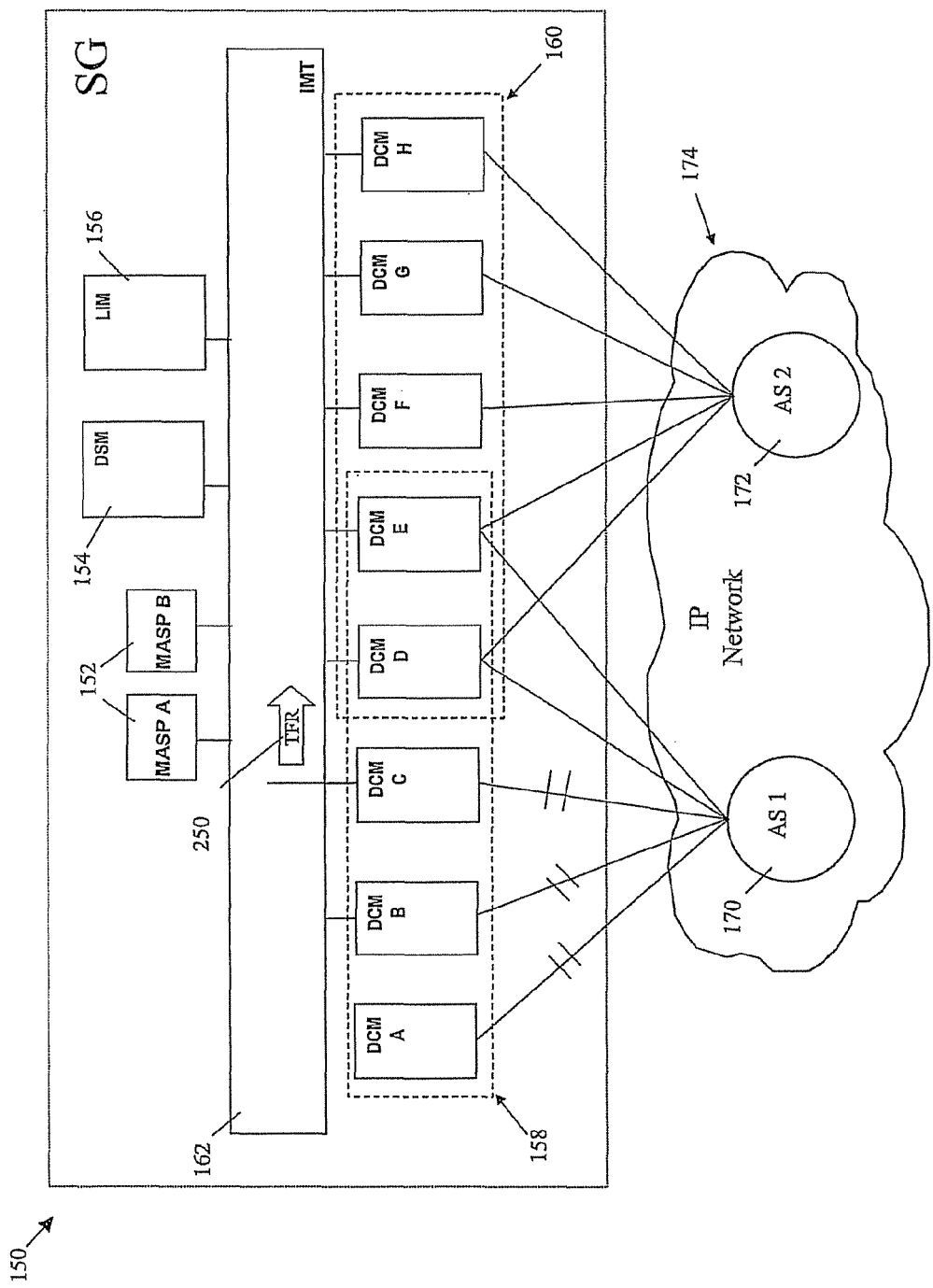
FIG. 7 is a block diagram of an SG routing node that illustrates the generation of an SS7 transfer-restricted network management message by a communication module that is a member of a signaling mateset according to an embodiment of the subject matter described herein.

In another embodiment, each member of a mateset is capable of serving as the SS7 NM controller for any given network management event. For example, consider the signaling mateset 158 illustrated in FIG. 7. Mateset 158 includes five DCM communication module members A-E, where each DCM module hosts a separate signaling link entity that is associated with a route to AS 170. For the purposes of illustration, assume that initially all virtual signaling link entities in mateset 158 associated with the route to AS 170 are available. At some point, the virtual signaling entities associated with DCM modules A, B and C become unavailable, while the two remaining signaling link entities residing on DCMs D and E remain available. Assuming the signaling link entity on DCM A fails first, followed by the failure of the signaling link entity on DCM B, and then by the failure of the DCM C signaling link entity, a NM function on DCM C is adapted to generate an SS7 TFR message 250 that is associated with the affected destination (i.e., AS 170) and which is distributed using a broadcast method to SS7 signaling nodes that are adjacent to SG 150. No other members of the mateset generate a TFR message associated with this signaling link entity failure. In this example, three of five signaling link entities fail before TFR network management procedures are triggered, however, it will be appreciated that the signaling link entity failure threshold for TFR generation may be configured by a network operator. Furthermore, in one embodiment, network management procedures, such as TFR message generation, may be triggered at the IP connection level. That is, for example, TFR network management procedures may be invoked in response to the failure/congestion of a particular number or percentage of IP connections. Once again, such IP connection-level NM thresholds may be configured by a network operator.

In order for one member of a mateset to be the network monitoring controller or proxy, it is necessary that the designated member receive status updates from other members. Using the mechanisms described herein, such communication can occur without unnecessarily wasting internal communication network bandwidth or processing resources.

Figure 8:
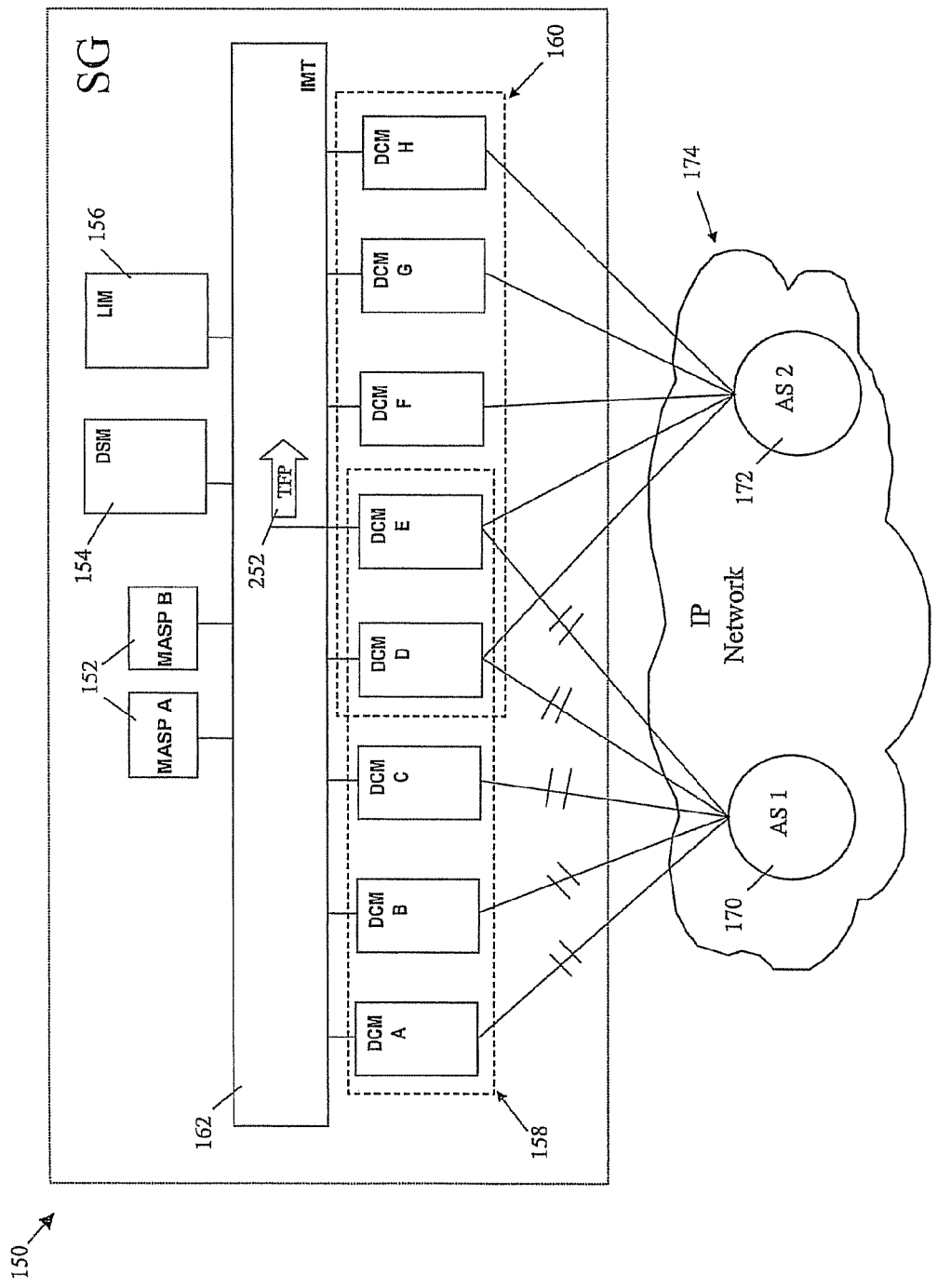
FIG. 8 is a block diagram of an SG routing node that illustrates the generation of an SS7 transfer-prohibited network management message by a communication module that is a member of a signaling mateset according to an embodiment of the subject matter described herein.

Continuing with this example, consider the scenario illustrated in FIG. 8, where all of the virtual signaling link entities in mateset 158 associated with a route to AS 170 have failed. More particularly, for the purposes of illustration, assume that the signaling link entity associated with DCM E is the last to fail. In this case, upon loss of the last IP connection associated with the signaling link entity on DCM E, a NM function on DCM E is adapted to generate an SS7 TFP message 252 that is associated with the affected destination (i.e., AS 170) and which is distributed using a broadcast method to SS7 signaling nodes that are adjacent to SG 150. No other members of the mateset generate a TFP message associated with this final signaling link entity failure.

Figure 9:
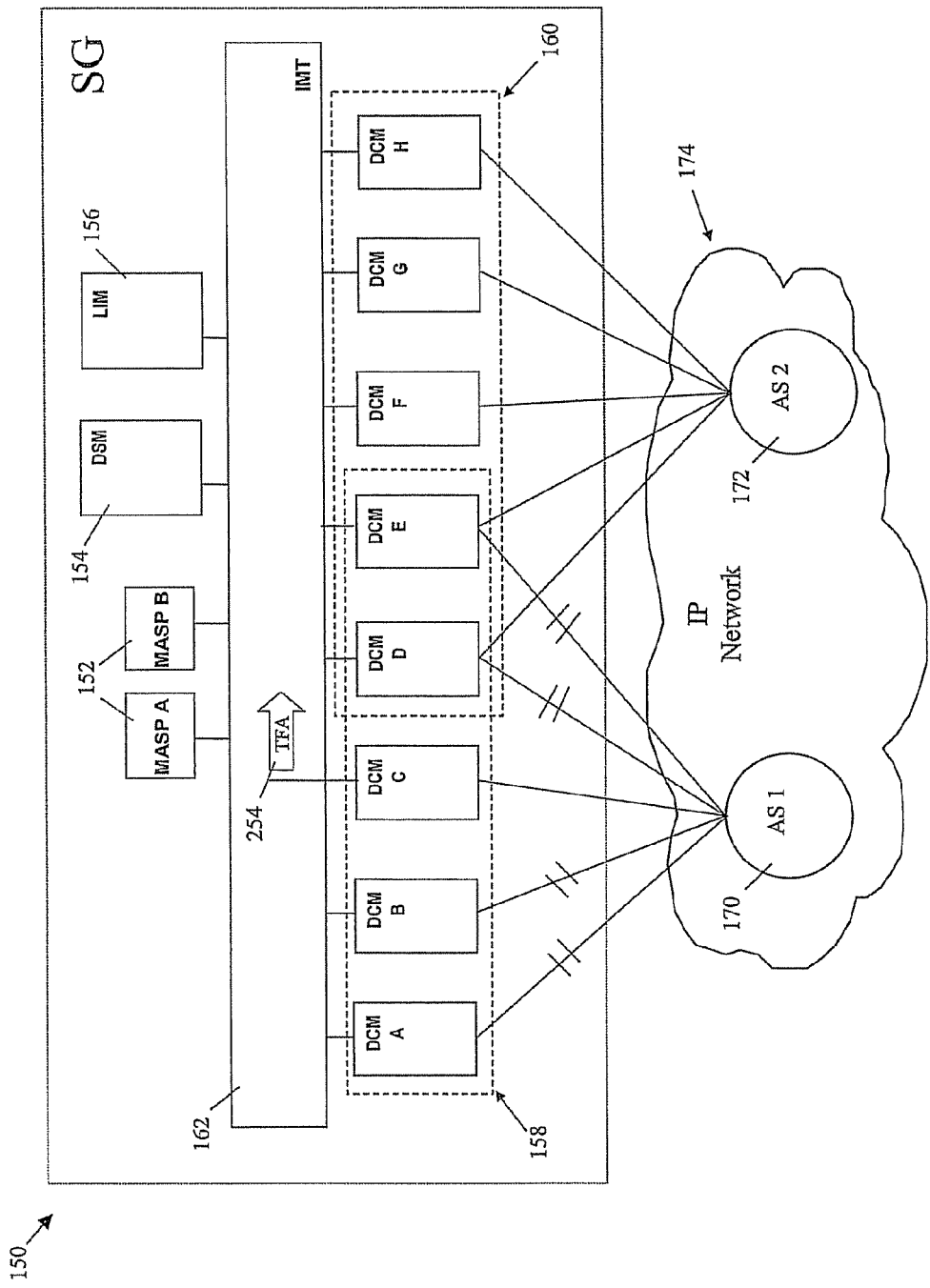
FIG. 9 is a block diagram of an SG routing node that illustrates the generation of an SS7 transfer-allowed network management message by a communication module that is a member of a signaling mateset according to an embodiment of the subject matter described herein.

Continuing still further with this example, in the scenario illustrated in FIG. 9, the signaling link entity associated with DCM C is the first mateset member to re-establish an IP connection to AS 170. In this case, a NM function on DCM C is adapted to generate an SS7 TFA message 254 that is associated with the affected destination (i.e., AS 170) and which is distributed using a broadcast method to SS7 signaling nodes that are adjacent to SG 150. It will be appreciated that the same approaches to generating and distributing network management information described above may be applied to SCCP UPU messages, and to any other SS7 network management related messaging.

Network Management Message Replication And Distribution

In an SS7 signaling message routing node, SS7 network management messages are often generated and transmitted to adjacent signaling points (i.e., adjacent point codes). This poses several problems for communication modules in a routing system of the subject matter described herein that are adapted to host virtual signaling link entities. That is, since a virtual signaling link entity as described herein may represent multiple IP connections, a single SS7 NM message received by a mateset member must be replicated and distributed to each IP connection. In one embodiment, NM function 218 is adapted to perform such NM replication and distribution tasks on a DCM communication module. NM function 218 is further adapted to selectively replicate and distribute NM messages to only those IP connections associated with remote hosts/applications that are compatible with the network type of the NM message. For example, NM function 218 may distribute network management information associated with an ANSI network to only those IP connections associated with a virtual signaling link entity servicing ANSI-capable IP destinations. It is possible that a single IP connection may be adapted to service multiple network types, and in this case NM function 218 may replicate and distribute NM information associated with multiple network types to the same IP connection. In one embodiment, NM function 218 may utilize IP connection-to-network type mapping information such as that illustrated above in Table 8 in order to determine over which IP connections network type-specific NM information should be communicated. The network type associated with a received NM message may be determined based on the inbound signaling link or the message originator. In another embodiment, information contained in the NM message may be examined to determine the associated network type. For example, national network indicator information in the service indicator octet (SIO) field of an SS7 message signaling unit may be used to identify whether a NM message is associated with an international or a national signaling network.

Figure 10:
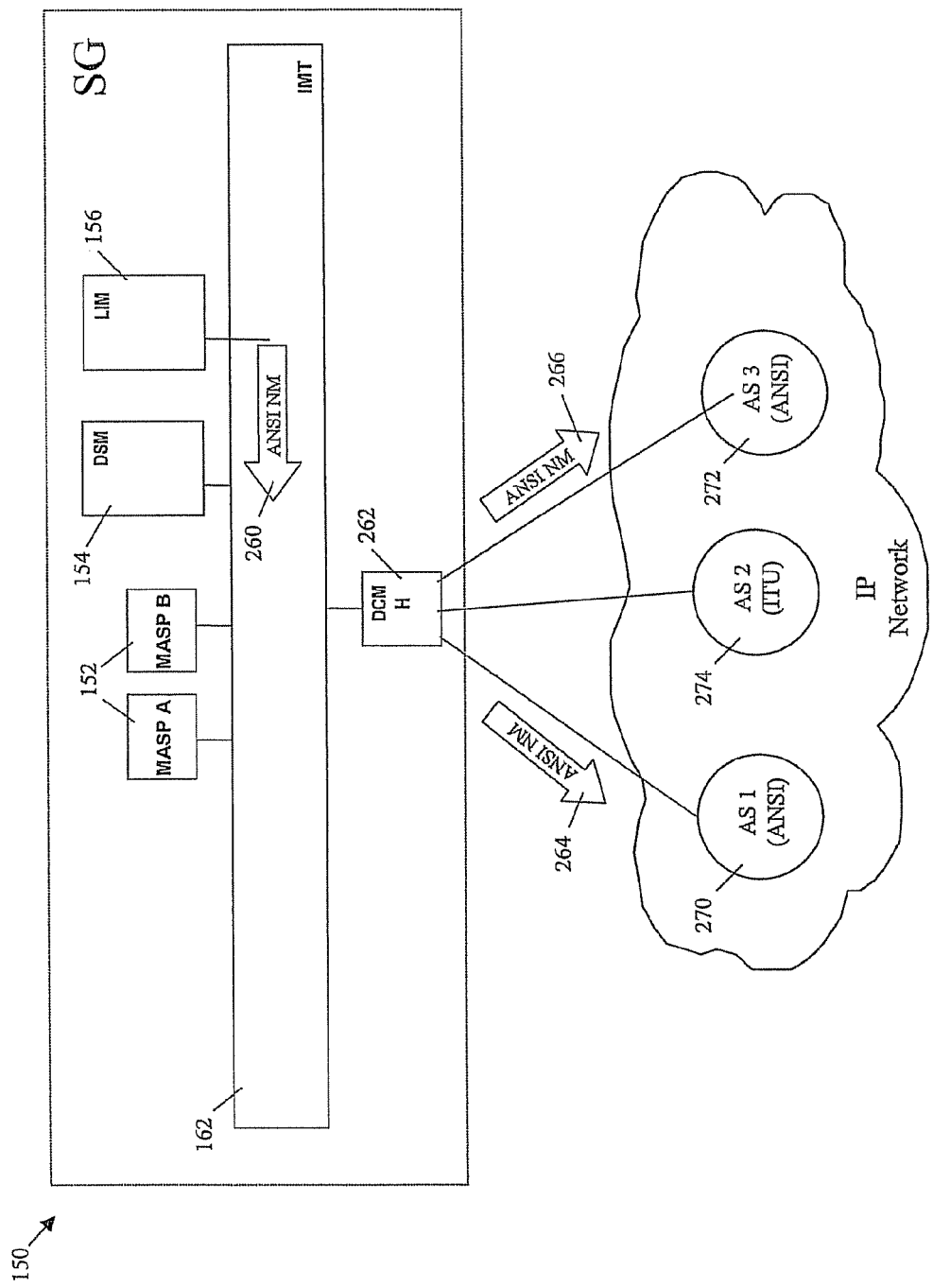
FIG. 10 is a block diagram that illustrates the selective replication and distribution of an SS7 network management message to IP destinations according to an embodiment of the subject matter described herein.

An example of such selective NM replication and distribution is illustrated in FIG. 10, where SS7 LIM 156 generates an ANSI NM message 260 that is communicated to a DCM mateset member 262. An NM function, such as NM function 218 shown in FIG. 5, is adapted to receive the ANSI NM message 260 and replicate the message, thereby creating ANSI NM messages 264 and 266. ANSI NM messages 264 and 266 are selectively communicated via IP connections to ANSI IP destinations 270 and 272, respectively. The ANSI NM message 260 is not replicated and communicated via an IP connection to ITU IP destination 274.

It will be appreciated that the subject matter described herein may be implemented within a signaling message routing node, such as an SS7-over-IP signaling gateway, which includes only IP communication modules (e.g., DCM modules). That is, the subject matter described herein does not require the presence of SS7/MTP communication interfaces in a routing node. Similarly, the subject matter described herein may also be practiced in an all SS7-over-ATM signaling gateway, with or without the presence of SS7/MTP communication modules in the system.

Furthermore, it will be understood that various details of the invention may be changed without departing from the scope of the invention. Furthermore, the foregoing description is for the purpose of illustration only, and not for the purpose of limitation—the invention being defined by the claims.

What is claimed is:

1. A signaling message routing system, the system comprising:
   a signaling message routing node, the signaling message routing node including:
   (a) a first communication module configured to host at least one first signaling link for sending and receiving Internet protocol (IP) signaling messages via at least one first IP connection;
   (b) a second communication module configured to host at least one second signaling link for sending and receiving IP signaling messages via at least one second IP connection; and
   (c) a third communication module configured to host at least one third signaling link for sending and receiving signaling messages, wherein the first and second communications modules are configured to share with each other routing status information regarding the first and second IP connections and to share with the third communication module status information regarding the first and second signaling links.

2. The system of claim 1 wherein the first and second communication modules comprise IP communication modules and wherein the third communication module comprises an SS7 communication module.

3. The system of claim 1 wherein the first, second, and third communication modules comprise IP communication modules.

4. The system of claim 1 wherein at least one of the first, second, and third communication modules comprises a session initiation protocol (SIP) communication module.

5. The system of claim 1 including a network management (NM) function associated with the first communication module for receiving an SS7 NM message containing SS7 NM information and for communicating the SS7 NM information to IP signaling destinations over the at least one IP connection.

6. The system of claim 5 wherein the NM function is configured to communicate the SS7 NM information only to IP signaling destinations that are associated with the same network type as that of the SS7 NM message.

7. The system of claim 1 wherein the first communication module is configured to detect changes in status associated with signaling link entities hosted by the first communication module, to determine a highest hierarchical level signaling link entity affected by a change in status of a signaling link entity, and to inform at least the second communication module of the highest hierarchical level signaling link entity affected by the change in status.

* * * * *